(12) United States Patent
Abbas

(10) Patent No.: US 10,313,686 B2
(45) Date of Patent: Jun. 4, 2019

(54) APPARATUS AND METHODS FOR COMPRESSING VIDEO CONTENT USING ADAPTIVE PROJECTION SELECTION

(71) Applicant: GoPro, Inc., San Mateo, CA (US)

(72) Inventor: Adeel Abbas, Carlsbad, CA (US)

(73) Assignee: GoPro, Inc., San Mateo, CA (US)

(*) Notice: Subject to any disclaimer, the term of this patent is extended or adjusted under 35 U.S.C. 154(b) by 196 days.

(21) Appl. No.: 15/466,559

(22) Filed: Mar. 22, 2017

(65) Prior Publication Data

US 2018/0084257 A1    Mar. 22, 2018

Related U.S. Application Data

(60) Provisional application No. 62/397,274, filed on Sep. 20, 2016.

(51) Int. Cl.
*H04N 19/176* (2014.01)
*H04N 19/597* (2014.01)
(Continued)

(52) U.S. Cl.
CPC ......... *H04N 19/176* (2014.11); *H04N 19/105* (2014.11); *H04N 19/147* (2014.11); *H04N 19/597* (2014.11); *H04N 19/85* (2014.11)

(58) Field of Classification Search
CPC .................................................. H04N 19/176
(Continued)

(56) References Cited

U.S. PATENT DOCUMENTS 3,568,197 A    3/1971  Harold
3,780,303 A   12/1973  Smith et al.
(Continued)

FOREIGN PATENT DOCUMENTS

CA    2316440 A1    2/2001
EP    2369361 A1    9/2011
(Continued)

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.
Achanta R., et al., "Slic Superpixels Compared to State-of-The-Art Superpixel Methods," IEEE Transactions on Pattern Analysis and Machine Intelligence, 2012, vol. 34 (11), pp. 2274-2282.
(Continued)

*Primary Examiner* — Dave Czekaj
*Assistant Examiner* — Shanika M Brumfield
(74) *Attorney, Agent, or Firm* — Gazdzinski & Associates, PC

(57) ABSTRACT

Apparatus and methods for encoding panoramic content, such as by a wide field of view and large image size. In one implementation, a panoramic image may be mapped to a cube, equirectangular or any other projection e.g., icosahedron or octahedron. Projection may be selected adaptively based on evaluation of the panoramic content. Content evaluation may include obtaining rate distortion cost metric for a given projection configuration including projection type, projection arrangement, and projection orientation. Projection configuration with the lowest cost may be selected as target projection for encoding content. As content composition changes (e.g., object motion, texture presence and/or location) projection may be adaptively selected to match changes in the content. Adaptive content selection methodology may provide for a lower encoded bitrate for a given encoded quality and/or higher quality for a given bitrate.

20 Claims, 20 Drawing Sheets

(51) Int. Cl.
*H04N 19/105* (2014.01)
*H04N 19/147* (2014.01)
*H04N 19/85* (2014.01)

(58) Field of Classification Search
USPC .......................................... 375/240.02–240.2
See application file for complete search history.

(56) References Cited

U.S. PATENT DOCUMENTS

| | | | |
|---|---|---|---|
| 3,891,985 A | 6/1975 | Oigarden et al. | |
| 4,179,704 A | 12/1979 | Kaiser et al. | |
| 4,209,695 A | 6/1980 | Arnold et al. | |
| 4,278,885 A | 7/1981 | Von et al. | |
| 4,317,993 A | 3/1982 | Hertzog, Jr. et al. | |
| 4,365,154 A | 12/1982 | Arnold et al. | |
| 4,387,302 A | 6/1983 | Givens | |
| 4,499,380 A | 2/1985 | Aggour et al. | |
| 4,851,687 A | 7/1989 | Ettinger et al. | |
| 5,021,664 A | 6/1991 | Hinshaw | |
| 5,068,532 A | 11/1991 | Wormald et al. | |
| 5,076,993 A | 12/1991 | Sawa et al. | |
| 5,098,640 A | 3/1992 | Gozani et al. | |
| 5,239,568 A | 8/1993 | Grenier | |
| 5,521,817 A | 5/1996 | Burdoin et al. | |
| 5,561,434 A | 10/1996 | Yamazaki | |
| 5,712,885 A | 1/1998 | Sowerby et al. | |
| 5,832,379 A | 11/1998 | Mallinckrodt | |
| 5,945,239 A * | 8/1999 | Taniguchi | G03F 7/70258 430/30 |
| 6,018,659 A | 1/2000 | Ayyagari et al. | |
| 6,034,634 A | 3/2000 | Karlsson et al. | |
| 6,044,323 A | 3/2000 | Yee et al. | |
| 6,061,562 A | 5/2000 | Martin et al. | |
| 6,108,538 A | 8/2000 | Blasiak et al. | |
| 6,144,032 A | 11/2000 | Gazdzinski | |
| 6,246,413 B1 * | 6/2001 | Teo | G06T 17/00 345/419 |
| 6,256,476 B1 | 7/2001 | Beamish et al. | |
| 6,281,838 B1 | 8/2001 | Hong | |
| 6,504,569 B1 | 1/2003 | Jasinschi et al. | |
| 6,513,758 B1 | 2/2003 | Lloyd | |
| 6,515,673 B1 * | 2/2003 | Hashimoto | G06T 15/04 345/423 |
| 6,559,853 B1 * | 5/2003 | Hashimoto | G06T 15/04 345/419 |
| 6,611,607 B1 | 8/2003 | Davis et al. | |
| 6,628,941 B2 | 9/2003 | Knoblach et al. | |
| 6,711,278 B1 * | 3/2004 | Gu | G06K 9/32 348/169 |
| 6,718,161 B1 | 4/2004 | Westall et al. | |
| 6,728,317 B1 | 4/2004 | Demos | |
| 6,756,937 B1 | 6/2004 | Chang et al. | |
| 6,856,803 B1 | 2/2005 | Gross et al. | |
| 6,873,301 B1 | 3/2005 | Lopez | |
| 6,996,244 B1 | 2/2006 | Slaney et al. | |
| 7,095,376 B1 | 8/2006 | Timothy et al. | |
| 7,212,170 B1 | 5/2007 | Dean et al. | |
| 7,653,635 B1 * | 1/2010 | Paek | G06F 17/30038 707/999.1 |
| 7,750,904 B2 | 7/2010 | Jojic et al. | |
| 7,777,674 B1 | 8/2010 | Haddadin et al. | |
| 7,860,326 B2 * | 12/2010 | Takishima | H04N 1/41 382/232 |
| 8,000,539 B2 * | 8/2011 | Guleryuz | H04N 19/46 348/384.1 |
| 8,078,162 B2 | 12/2011 | Deaton et al. | |
| 8,116,763 B1 | 2/2012 | Olsen | |
| 8,183,999 B1 | 5/2012 | Giallorenzi et al. | |
| 8,190,147 B2 | 5/2012 | Kauffman | |
| 8,290,253 B1 | 10/2012 | Wang et al. | |
| 8,558,734 B1 | 10/2013 | Piesinger | |
| 8,606,073 B2 | 12/2013 | Woodman | |
| 8,897,770 B1 | 11/2014 | Frolov et al. | |
| 9,100,086 B1 | 8/2015 | Olsen | |
| 9,119,179 B1 | 8/2015 | Firoiu et al. | |
| 9,171,577 B1 * | 10/2015 | Newman | G11B 27/031 |
| 9,396,588 B1 * | 7/2016 | Li | G06F 3/011 |
| 9,488,981 B2 | 11/2016 | Pillai et al. | |
| 9,547,908 B1 | 1/2017 | Kim et al. | |
| 9,575,803 B2 | 2/2017 | Chauvet et al. | |
| 9,590,720 B2 | 3/2017 | Jalali | |
| 9,681,111 B1 | 6/2017 | Newman | |
| 10,148,939 B2 * | 12/2018 | Macmillan | H04N 5/23238 |
| 2001/0048753 A1 * | 12/2001 | Lee | G06T 7/11 382/103 |
| 2002/0018523 A1 * | 2/2002 | Jayant | H04N 19/30 375/240.08 |
| 2002/0061730 A1 | 5/2002 | Hart et al. | |
| 2002/0168974 A1 | 11/2002 | Rosen et al. | |
| 2003/0007567 A1 | 1/2003 | Newman et al. | |
| 2003/0040274 A1 | 2/2003 | Dai et al. | |
| 2003/0095067 A1 | 5/2003 | Howell | |
| 2003/0147547 A1 | 8/2003 | Lin et al. | |
| 2003/0223354 A1 | 12/2003 | Olszewski | |
| 2004/0017504 A1 | 1/2004 | Prandoni et al. | |
| 2004/0034781 A1 | 2/2004 | Natarajan | |
| 2004/0038658 A1 | 2/2004 | Gurelli et al. | |
| 2004/0105597 A1 * | 6/2004 | Lelescu | G06T 3/0018 382/276 |
| 2004/0131229 A1 | 7/2004 | Acharya et al. | |
| 2004/0152480 A1 | 8/2004 | Willars et al. | |
| 2005/0031214 A1 * | 2/2005 | Zhang | H04N 19/597 382/232 |
| 2005/0035897 A1 | 2/2005 | Perl et al. | |
| 2005/0107077 A1 | 5/2005 | Hintermeier et al. | |
| 2005/0108374 A1 | 5/2005 | Pierzga et al. | |
| 2005/0117805 A1 | 6/2005 | Poutet et al. | |
| 2005/0143005 A1 | 6/2005 | Moore | |
| 2005/0243005 A1 | 11/2005 | Rafi et al. | |
| 2005/0264438 A1 | 12/2005 | Fullerton et al. | |
| 2006/0009262 A1 | 1/2006 | Hamm | |
| 2006/0063566 A1 | 3/2006 | Maruta | |
| 2006/0071825 A1 | 4/2006 | Demos | |
| 2006/0238411 A1 | 10/2006 | Fullerton et al. | |
| 2006/0251289 A1 | 11/2006 | Williams et al. | |
| 2007/0090990 A1 | 4/2007 | Nelson | |
| 2007/0110298 A1 | 5/2007 | Graepel et al. | |
| 2007/0184849 A1 | 8/2007 | Zheng | |
| 2007/0224931 A1 | 9/2007 | Fitton et al. | |
| 2007/0230419 A1 | 10/2007 | Raman et al. | |
| 2008/0090606 A1 | 4/2008 | Hwang et al. | |
| 2008/0117858 A1 | 5/2008 | Kauffman | |
| 2008/0170626 A1 | 7/2008 | Sung et al. | |
| 2008/0180439 A1 | 7/2008 | Adabala et al. | |
| 2008/0233865 A1 | 9/2008 | Malarky et al. | |
| 2008/0270569 A1 | 10/2008 | McBride et al. | |
| 2008/0276089 A1 | 11/2008 | Tian | |
| 2009/0092072 A1 | 4/2009 | Imamura et al. | |
| 2009/0132371 A1 | 5/2009 | Strietzel et al. | |
| 2009/0153730 A1 | 6/2009 | Knee et al. | |
| 2009/0208086 A1 * | 8/2009 | Pelc | G06T 9/00 382/131 |
| 2009/0209277 A1 | 8/2009 | Pinchas et al. | |
| 2009/0219912 A1 | 9/2009 | Wengerter et al. | |
| 2009/0295485 A1 | 12/2009 | Mitchell | |
| 2009/0324191 A1 | 12/2009 | Reusens et al. | |
| 2010/0070836 A1 * | 3/2010 | Wegener | G06T 9/00 714/799 |
| 2010/0085236 A1 | 4/2010 | Franceschini et al. | |
| 2010/0172299 A1 | 7/2010 | Fischer et al. | |
| 2010/0177977 A1 | 7/2010 | Seshadri et al. | |
| 2010/0224732 A1 | 9/2010 | Olson et al. | |
| 2010/0266157 A1 | 10/2010 | Shin et al. | |
| 2010/0273504 A1 | 10/2010 | Bull et al. | |
| 2010/0284377 A1 | 11/2010 | Wei et al. | |
| 2010/0290412 A1 | 11/2010 | Ahn et al. | |
| 2011/0032149 A1 | 2/2011 | Leabman | |
| 2011/0103293 A1 | 5/2011 | Gale et al. | |
| 2011/0122024 A1 | 5/2011 | Eidloth et al. | |
| 2011/0142150 A1 | 6/2011 | Anigstein et al. | |
| 2011/0182230 A1 | 7/2011 | Ohm et al. | |
| 2011/0286325 A1 | 11/2011 | Jalali et al. | |
| 2011/0286372 A1 | 11/2011 | Taghavi et al. | |

(56) References Cited

U.S. PATENT DOCUMENTS

| | | | |
|---|---|---|---|
| 2011/0286625 | A1 | 11/2011 | Petrovic et al. |
| 2012/0002112 | A1 | 1/2012 | Huang et al. |
| 2012/0052828 | A1 | 3/2012 | Kamel et al. |
| 2012/0063670 | A1 | 3/2012 | Woo |
| 2012/0170805 | A1 | 7/2012 | Brown et al. |
| 2012/0202430 | A1 | 8/2012 | Jalali et al. |
| 2012/0235863 | A1 | 9/2012 | Erdos et al. |
| 2012/0281871 | A1 | 11/2012 | Reed et al. |
| 2013/0040655 | A1 | 2/2013 | Keidar |
| 2013/0070677 | A1 | 3/2013 | Chang |
| 2013/0109299 | A1 | 5/2013 | Roos et al. |
| 2013/0155847 | A1 | 6/2013 | Li et al. |
| 2013/0156021 | A1 | 6/2013 | Ashikhmin et al. |
| 2013/0303080 | A1 | 11/2013 | Moreno |
| 2013/0314442 | A1 | 11/2013 | Langlotz et al. |
| 2013/0321204 | A1 | 12/2013 | Zahavi et al. |
| 2013/0331026 | A1 | 12/2013 | O'Neill et al. |
| 2014/0003302 | A1 | 1/2014 | Han et al. |
| 2014/0003394 | A1 | 1/2014 | Rubin et al. |
| 2014/0022394 | A1 | 1/2014 | Bae et al. |
| 2014/0049643 | A1 | 2/2014 | Segerstrom et al. |
| 2014/0050454 | A1 | 2/2014 | Slotte |
| 2014/0063061 | A1 | 3/2014 | Reitan |
| 2014/0073337 | A1 | 3/2014 | Hong et al. |
| 2014/0105054 | A1 | 4/2014 | Sägrov et al. |
| 2014/0139372 | A1 | 5/2014 | Seol et al. |
| 2014/0241239 | A1 | 8/2014 | Chang |
| 2014/0267801 | A1 | 9/2014 | Grundmann et al. |
| 2014/0335817 | A1 | 11/2014 | Hyde et al. |
| 2014/0347223 | A1 | 11/2014 | Hyde et al. |
| 2014/0348140 | A1 | 11/2014 | Atkinson |
| 2015/0142966 | A1 | 5/2015 | Baran et al. |
| 2015/0181231 | A1* | 6/2015 | Jung ............... H04N 19/142 375/240.02 |
| 2015/0236778 | A1 | 8/2015 | Jalali |
| 2015/0236779 | A1 | 8/2015 | Jalali |
| 2015/0236780 | A1 | 8/2015 | Jalali |
| 2015/0236781 | A1 | 8/2015 | Jalali |
| 2015/0237569 | A1 | 8/2015 | Jalali |
| 2015/0280812 | A1 | 10/2015 | Jalali |
| 2015/0301529 | A1 | 10/2015 | Pillai et al. |
| 2015/0304885 | A1 | 10/2015 | Jalali et al. |
| 2015/0362917 | A1 | 12/2015 | Wang et al. |
| 2015/0371447 | A1 | 12/2015 | Yasutake |
| 2016/0013858 | A1 | 1/2016 | Jalali et al. |
| 2016/0057363 | A1 | 2/2016 | Posa |
| 2016/0080830 | A1 | 3/2016 | Kim et al. |
| 2016/0088498 | A1 | 3/2016 | Sharawi |
| 2016/0112116 | A1 | 4/2016 | Jalali et al. |
| 2016/0125633 | A1 | 5/2016 | Windmark et al. |
| 2016/0134358 | A1 | 5/2016 | Jalali et al. |
| 2016/0205341 | A1 | 7/2016 | Hollander et al. |
| 2016/0274338 | A1 | 9/2016 | Davies et al. |
| 2016/0337027 | A1 | 11/2016 | Jalali |
| 2016/0358628 | A1 | 12/2016 | Liu et al. |
| 2016/0366396 | A1 | 12/2016 | Kim et al. |
| 2018/0205934 | A1* | 7/2018 | Abbas ............... H04N 19/40 |

FOREIGN PATENT DOCUMENTS

| | | |
|---|---|---|
| EP | 2801838 A1 | 11/2014 |
| JP | S6141979 A | 2/1986 |
| WO | WO-2014007873 A2 | 1/2014 |

OTHER PUBLICATIONS

Adsumilli C., "A dissertation submitted in partial satisfaction of the requirements for the degree of Doctor of Philosophy in Electrical and Computer Engineering", Sep. 2005, 193 pages.

Adsumilli C. et al., "A Dynamically Adaptive Constrained Unequal Error Protection Scheme for Video Transmission over Wireless Channels", Proceedings IEEE International Workshop on Multimedia Signal Processing, 2002, pp. 41-44, Virgin Islands, USA.

Adsumilli C. et al., "A Hybrid Constrained Unequal Error Protection and Data Hiding Scheme for Packet Video Transmission", Proceedings IEEE International Conference on Acoustics, Speech, and Signal Processing (ICASSP), Apr. 2003, pp. V680-V683, Hong Kong.

Adsumilli C. et al., A Noise Based Quantization Model for Restoring Block Transform Compressed Images:, Proceedings of the IAST£0 International Conference Signal and Image Processing, Aug. 13-16, 2001, pp. 354-359, Honolulu, Hawaii, USA.

Adsumilli C. et al., "A Robust Error Concealment Technique Using Data Hiding for Image and Video Transmission Over Lossy Channels", IEEE Transactions on Circuits and Systems for Video Technology, Nov. 2005, pp. 1394-1406, vol. 15(11).

Adsumilli C. et al., "Adapive Wireless Video Communications: Challenges and Approaches", Proceedings of International Workshop on Packet Video, Apr. 2002, pp. 1-11, Pittsburgh, Pennsylvania, USA.

Adsumilli C. et al., "Detector Performance Analysis of Watermark-Based Error Concealment In Image Communications", Proceedings IEEE International Conference on Image Processing, 2005, pp. 916-919, vol. 3.

Adsumilli C. et al, "Error Concealment in Video Communications by Informed Watermarking", PSIVT, 2006, pp. 1094-1102.

Adsumilli C. et al., "Error Concealment in Video Communications Using DPCM Bit Stream Embedding", Proceedings IEEE International Conference on Acoustics, Speech and Signal Processing (ICASSP), Apr. 2005, pp. 11-169-11-172, Philadelphia, USA.

Allène C., et al., "Seamless Image-based Texture Atlases Using Multi-band Blending," Pattern Recognition, 2008. ICPR 2008. 19th International Conference on, 2008.

Badrinarayanan V., et al., "Segnet: a Deep Convolutional Encoder-Decoder Architecture for Image Segmentation," arXiv preprint arXiv:1511.00561, 2015.

Baker, et al., "A Database and Evaluation Methodology for Optical Flow" International Journal of Computer Vision 92.1 (2011): 1-31.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Boucherkha, S., et al., "A Lossless Watermarking Based Authentication System for Medical Images", Would Academy of Science, Engineering and Technology, International Journal of Medical, Health, Biomedical, Bioengineering and Pharmaceutical Engineering, 2007, vol. 1, No. 1, pp. 20-23.

Brainard R.C., et al., "Low-Resolution TV: Subjective Effects of Frame Repetition and Picture Replenishment," Bell Labs Technical Journal, Jan. 1967, vol. 46 (1), pp. 261-271.

Brox, et al., "High Accuracy Optical Flow Estimation Based on a Theory for Warping", European Conference on Computer Vision, Springer-Verlag Berlin Heidelberg, 2004.

Burt et al., "A Multiresolution Spline with Application to Image Mosaics," in ACM Transactions on Graphics (TOG), 1983, vol. 2, No. 4, pp. 217-236.

Carli M. et al., "Video Watermarking in 30 OCT Domain", Proceedings of International Workshop on Spectral Methods and Multirate Signal Processing, Jun. 2005, pp. 141-144, Riga, Lavia, (Invited Paper).

Cavallaro, et al., "Object-based video: extraction tools, evaluation metrics and applications", Visual Communications and Image Processing; Jul. 8, 2003-Jul. 11, 2003, Lugano Switzerland, XP030080620.

Chan et al., "Active contours without edges". IEEE Transactions on Image Processing, 2001, 10 (2), pp. 266-277 (hereinafter "Chan").

(56) References Cited

OTHER PUBLICATIONS

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.
Davis, et al., "The Visual Microphone: Passive Recovery of Sound from Video" (2014).
Didyk, et al., "Joint View Expansion and Filtering for Automultiscopic 3D Displays", ACM Transactions on Graphics (TOG) 32.6 (2013): 221.
Elen, "Whatever happened to Ambisonics" AudioMedia Magazine, Nov. 1991.
Freeman, et al., "Shape-Time Photography" IEEE Computer Society Conference on Computer Vision and Pattern Recognition, vol. 2. IEEE, 2003.
Fridrich, J., et al., "Lossless Data Embedding—New Paradigm in Digital Watermarking", EURASIP Journal on Applied Signal Processing, Oct. 29, 2001, pp. 185-196.
Gracias, et al., "Fast Image Blending Using Watersheds and Graph Cuts," Image and Vision Computing, 2009, vol. 27 (5), pp. 597-607.
H.264 (Jan. 2012) and/or ISO/IEC 14496 10:2012, Information technology Coding of audio visual objects Part 10: Advanced Video Coding.
H.265 (Dec. 2016) also known as High Efficiency Video Code (HVEC),(described in e.g., ITU T Study Group 16—Video Coding Experts Group (VCEG)—ITU T H.265, and/or ISO/IEC JTC 1/SC 29/WG 11 Motion Picture Experts Group (MPEG)—the HEVC standard ISO/IEC 23008 2:2015.
Haouzia et al., "Methods for Image Authentication: A Survey," Multimedia Tools Appl, 2008, 46 pages.
Herbst E., et al., "Occlusion Reasoning for Temporal Interpolation Using Optical Flow," Department of Computer Science and Engineering, University of Washington, Tech. Rep. UW-CSE-09-08-01, 2009.
Huang, et al., "Maximum a Posteriori Probability Estimation for Online Surveillance Video Synopsis", IEEE Transactions on Circuits and Systems for Video Technology, IEEE Service Center, Piscataway, NJ, US, vol. 24, No. 8, Aug. 1, 2014 (Aug. 1, 2014), pp. 1417-1429.
Jakubowski M., et al., "Block-based motion estimation algorithms—a survey," Opto-Electronics Review 21, No. 1 (2013), pp. 86-102.
Kaur, M., et al., "A Review on Digital Watermarkign Using LSB", International Journal of Advanced Research in Computer Science and Software Engineering, Nov. 2005, vol. 5, Issue 11, pp. 1210-1214.
Kendall A., et al., "Bayesian Segnet: Model Uncertainty in Deep Convolutional Encoder-Decoder Architectures for Scene Understanding," arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-I 1 Optical Flow," Joint Pattern Recognition Symposium, 2009, pp. 432-441.

Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schnyder, et al., "Depth image based compositing for stereo 3D", 3DTV-Conference: The True Vision—Capture, Transmission and Display of 3D Video (3DTV-CON), 2012, IEEE, Oct. 15, 2012, pp. 1-4.
Schnyder L., et al., "2D to 3D Conversion of Sports Content using Panoramas," Image Processing (ICIP), 2011, IEEE, pp. 1961-1964.
Schwartz, E., et al., "Implementation of Compression with Reversible Embedded Wavelets," In Proc. SPIE, 1995, 12 pages.
Shannon, "A Mathematical Theory of Communication", Bell Syst. Tech. J., 27:379-423, 623-656, 1948.
Suzuki et al., "Inter Frame Coding with Template Matching Averaging," in IEEE International Conference on Image Processing Proceedings (2007), vol. (III), pp. 409-412.
Szeliski, et al., "Fast Poisson blending using Multi-Splines." Computational Photography (ICCP), 2011 IEEE International Conference.
Szeliski R., "Computer vision: algorithms and applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Tonci F. et al., "Buffer Constraints for Rate-Distortion Optimization in Mobile Video Communications", Proceedings of International Symph on Signals, Circuits and Systems, Jul. 2005, pp. 71-74, Lasi, Romania (Invited Paper).
Vass, J., et al., "Efficient Three-Dimensional Wavelet Codecs for Networked Video Communication," in Proceedings of IEEE International Conference on Image Processing, Kobe, Japan, Oct. 1999, pp. 565-569.
Wadhwa, et al., "Phase-Based Video Motion Processing", ACM Transactions on Graphics (TOG) 32.4 (2013): 80.
Weinzaepfel, et al., "Deepflow: Large displacement optical flow with deep matching", Proceedings of the IEEE International Conference on Computer Vision, 2013.
Xiao, et al., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

* cited by examiner

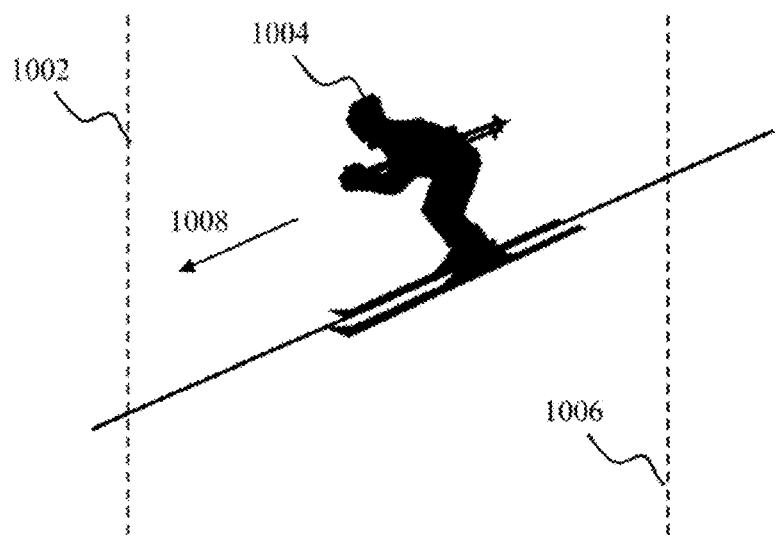
FIG. 9A
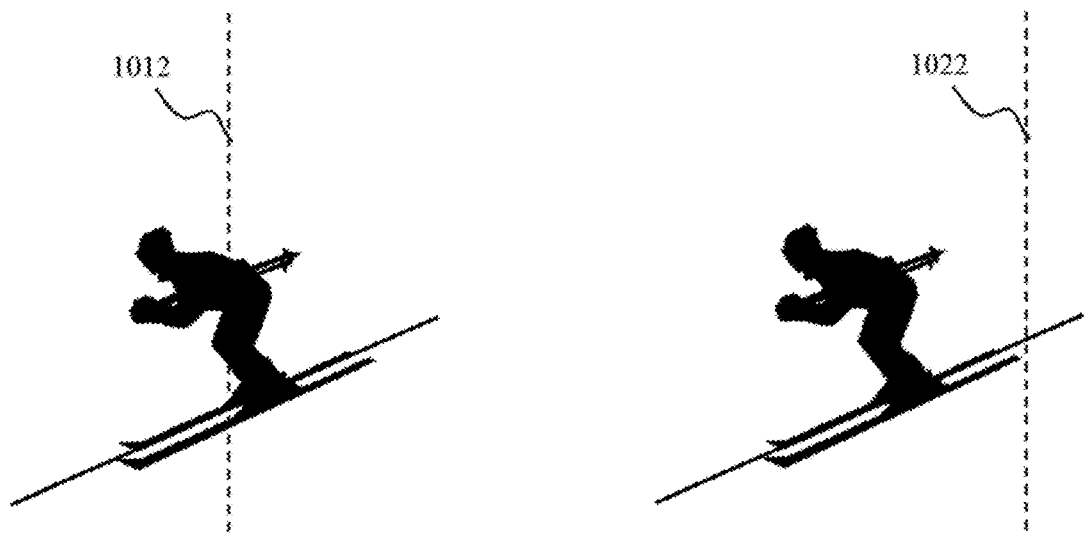
FIG. 9B
FIG. 9C

APPARATUS AND METHODS FOR COMPRESSING VIDEO CONTENT USING ADAPTIVE PROJECTION SELECTION

PRIORITY

This application claims the benefit of priority to U.S. Provisional Patent Application Ser. No. 62/397,274 of the same title filed on Sep. 20, 2016, the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image data and/or video content, and more particularly in one exemplary aspect to encoding, decoding, and transmission of video content.

Description of Related Art

Commodity camera technologies are generally fabricated to optimize image capture from a single vantage point. Single vantage capture is poorly suited for virtual reality (VR) and panoramic uses which require much wider fields of view (FOV); thus, many existing applications for wide FOV use multiple cameras to capture different vantage points of the same scene. The source images are then stitched together (e.g., in post-processing) to create the final panoramic image or other wide field of view content.

So-called "virtual reality" (VR) (and its mixed reality progeny; e.g., augmented reality) is a computer technology that seeks to create an artificial environment for user interaction. Current prototypes render video, audio, and/or tactile content through a display consistent with the user's movement. For example, when a user tilts or turns their head, the image is also tilted or turned proportionately (audio and/or tactile feedback may also be adjusted). When effectively used, VR and VR-like content can create an illusion of immersion within an artificial world. Additionally, since the viewer is not physically constrained by the human body, the VR experience can enable interactions that would otherwise be difficult, hazardous, and/or physically impossible to do. VR has a number of interesting applications, including without limitation: gaming applications, medical applications, industrial applications, space/aeronautics applications, and geophysical exploration applications.

Existing techniques for stitching together wide field of view content from multiple images require significant computing resources. Artisans of ordinary skill in the related arts will recognize that the sheer quantity data that must be processed consumes significant memory resources, and the image manipulation algorithms are computationally expensive. For example, VR video content and/or panoramic video content can be characterized by high resolution and high data rates (e.g., 8192×4096 resolution in excess of 30 megabits per second (Mbps)). The aforementioned limitations significantly reduce the ability and convenience for consumers to create and share VR content. For example, a user may be able to capture the raw images needed to create a 360° panorama on a camera phone or other portable device; however, they must upload the images to a powerful computer or server to stitch together and encode the image. In addition, viewing 8K video on a resource constrained device e.g. smartphone may not possible (with bandwidth and power constraints).

Existing VR solutions must render the image according to the viewer's movements (which are arbitrary and not known ahead of time) with sufficient responsiveness to sustain the illusion of immersion within the artificial world. Thus, prior art VR solutions require significant processing resources and are limited to expensive hardware platforms. These requirements prohibit widespread adoption of VR and VR-like content. Accordingly, less onerous techniques are needed to enable VR and VR-like content on a wider range of devices and applications.

To these ends, solutions are needed to reduce resource requirements for VR processing and/or presentation devices so as to enable panoramic and other wide FOV content capture on commodity components (e.g., processors and memories). Ideally, such solutions would enable users to capture and conveniently review high data rate content on a resource limited device (e.g., battery operated computer, a tablet, smartphone or a head mounted display), and/or other devices that may be characterized by a given amount of available energy, data transmission bandwidth, and/or computational capacity.

SUMMARY

The present disclosure satisfies the foregoing needs by providing, inter alia, systems, methods, and apparatus for encoding panoramic image content.

In a first aspect, a system configured to encode images using adaptive projection selection is disclosed. In one embodiment, the system includes a network interface; one or more physical processors; and a storage apparatus in data communication with the one or more physical processors, the storage apparatus includes machine-readable instructions, machine-readable instructions configured to, when executed by the one or more physical processors, cause the system to: obtain a content block of data in a first projection; obtain a first rate distortion parameter associated with encoding the content block of data in the first projection; obtain a second rate distortion parameter associated with encoding the content block of data in a second projection, the second projection differing from the first projection; responsive to a determination that the second rate distortion parameter is lower than the first rate distortion parameter, select the second projection for the content block of data; obtain an encoded content block by encoding the content block of data in the second projection; and provide the encoded content block and a second projection configuration parameter to a target destination via the network interface.

In one variant, the first rate distortion parameter and the second rate distortion parameter each include a rate distortion cost parameter.

In another variant, the rate distortion cost parameter comprises a function of a number of bits used to encode an image and a measure of distortion.

In yet another variant, the measure of distortion corresponds to an image quality metric, the image quality metric configured based on a difference between the original input picture and content block of data in the encoded picture (for a given projection).

In yet another variant, the rate distortion cost parameter may include a function of a peak signal-to-noise ratio, the function of the peak signal-to-noise ratio including a measure of mean square error.

In yet another variant, the first projection and the second projection each include a differing projection type.

In yet another variant, the differing projection types may be selected from the group consisting of various projections, for example a cube map projection, an octahedron projection, an icosahedron projection, and/or an equirectangular projection.

In yet another variant, the first projection and the second projection each comprise a differing projection facet arrangement.

In yet another variant, the differing projection facet arrangements each include a same projection type.

In a second aspect, an integrated circuit configured to encode an image block is disclosed. In one embodiment, the integrated circuit includes logic configured to execute computer readable instructions; a data interface; and a non-transitory computer readable medium configured to store machine readable instructions, the machine readable instructions are configured to, when executed: obtain content in a given projection; encode the content with the given projection along a default orientation; compute a rate distortion cost of encoding the content with the given projection along the default orientation; rotate the content in a different orientation; encode the content with the given projection along a new orientation; compute a rate distortion cost of encoding the content with the given projection along the new orientation; compare the rate distortion cost of encoding the content with the given projection along the default orientation with the rate distortion cost of encoding the content with the given projection along the new rotated orientation to find an orientation that takes a lowest rate distortion cost to encode a picture; and return the lowest rate distortion cost.

In a third aspect, a computerized image decoder apparatus is disclosed. In one embodiment, the computerized image decoder apparatus includes a network interface; one or more physical processors; and a storage apparatus in data communication with the one or more physical processors and comprising machine readable instructions, the machine readable instructions are configured to, when executed by the one or more physical processors, cause the computerized image decoder apparatus to: if available, obtain a value of a projection type, the value of the projection type configured to indicate a need to change to a new projection format; convert a reference block of data to the new projection format, so that a currently decoded frame can decode from the projection type; convert a newly projected block into a desired arrangement; rotate the newly arranged block into a desired orientation; optionally store the newly converted block into a memory or a disk; predict from the newly converted block to decode a current image; complete decoding of the newly converted block by decoding a residue; add the residue to a predicted image and perform in-loop filtering; store a decoded image in a reference frame buffer; and render a newly decoded image on screen.

In a fourth aspect, a system configured to use continuity between image facets to improve encoding is disclosed. Various embodiments of the present disclosure include: a network interface; one or more physical processors; and a storage apparatus in data communication with the one or more physical processors. In one exemplary embodiment, the storage apparatus includes machine readable instructions that are configured to, when executed by the one or more physical processors, cause the system to: partition an image into facets; encode the facets; transform the encoded facets; and encode other image facets based on the transformed encoded facets. In some variants, the encoded facets may be transmitted or displayed.

In some variants, the transformations may include one or more operations selected from: rotation, vertical flipping, horizontal flipping, translation, warping, and scaling.

The images may include one or more virtual reality (VR) content, spherical fields of view, or other forms of content. In some variants, the content is a plurality of source images captured by a plurality of image sensors; where the plurality of source images are aligned and stitched to produce the spherical image representing video from all sides.

In some variants, the machine readable instructions further cause the system to project the image according to various projections, such as a cubic projection or an icosahedron projection.

In some variants, the machine readable instructions are configured to, cause the system to encode at least a portion of a video stream based on the transformed encoded facets.

In some other variants, one facet corresponds to a first camera, and another facet corresponds to a second camera.

In a fifth aspect, a system configured to use an augmented image to improve encoding is disclosed. In one exemplary embodiment, the system includes: one or more physical processors; and a storage apparatus in data communication with the one or more physical processors. In one exemplary embodiment, the machine readable instructions are configured to, when executed by the one or more physical processors, cause the system to: partition an image into a first image facet and a second image facet; encode the first image facet; transform the encoded first image facet; combine the transformed encoded first image facet with the partitioned image to form the augmented image; encode the second image facet based on the augmented image; and transmit at least the augmented image and the encoded second image facet to a display device for display.

In one such variant, the machine readable instructions cause the system to utilize at least one continuity across a boundary between the transformed encoded first image facet and another encoded image facet of the augmented image.

In some cases, the system may include a codec that employs raster pixel scan order.

In other cases the system includes a codec that is configured to effectuate motion prediction in top-to-bottom and left-to-right directions.

In still other cases, the machine readable instructions cause the system to select facet boundaries such that representation of an object is within the facet boundaries. In some such cases, the selection of facet boundaries is performed adaptively using motion information associated with a sensing apparatus that has captured the object.

In a sixth aspect, a system configured to use a reference frame for inter mode encoding is disclosed. In one embodiment, the system includes one or more physical processors; and a storage apparatus in data communication with the one or more physical processors. In one exemplary embodiment, the system is configured to: obtain a partitioned image; form a reference frame; and encode a frame of a video stream based at least partly on information from the reference frame.

In one variant, the information from the reference frame comprises at least one of pixel data, motion vector data, transform size data and/or residual data.

In another variant, the system is configured to select a configuration for the reference frame based at least partly on a target performance metric.

In still another variant, a partitioned image corresponds to another frame of the video stream.

In some variants, the first set of one or more image facets is an encoded image facet. In other variants, the first set of one or more image facets is a transformed encoded image facet.

In a seventh aspect, a computerized method of processing image data is disclosed. In one embodiment, the method includes: obtaining a first image; determining at least one transformation to be applied to the first image to create a second image; encoding the first image; and transmitting the encoded first image and data regarding the transformation, so as to reduce the amount of data that is needed to signal second image.

In one such variant, the first image is associated with a first time and first subject matter, and the second image is associated with a second time and the first subject matter; and the transformation comprises a linear translation in space.

In other variants, the method includes obtaining a facet of a larger, composite image, and the second image is a facet of the same composite image.

In an eighth aspect, methods associated with the aforementioned computerized image decoder apparatus, the aforementioned integrated circuit and the aforementioned systems is disclosed.

In a ninth aspect, a method of encoding images using adaptive projection selection is disclosed. In one embodiment, the method includes obtaining a first rate distortion parameter for encoding an image block in a first image representation; selecting a second image representation, the second image representation differing from the first image representation; obtaining a second rate distortion parameter for encoding the image block in the second image representation; and obtaining a target rate distortion parameter by comparing the first rate distortion parameter with the second rate distortion parameter.

In one variant, the method further includes determining that the second rate distortion parameter is less than the first rate distortion parameter and assigning the target rate distortion parameter to the second rate distortion parameter. Here, the rate distortion parameter may refer to rate distortion cost, associated motion vectors/modes and intra coding modes.

In another variant, the method further includes encoding the image block using the second image representation and providing the second image representation to a network interface.

In yet another variant, the method further includes determining that the first rate distortion parameter is less than the second rate distortion parameter and assigning the selected "best" rate distortion parameter to the first rate distortion parameter.

In yet another variant, the second image representation differs from the first image representation by altering one or more of a projection type, a projection arrangement, and a projection orientation.

In a tenth aspect, an encoder apparatus is disclosed. In one embodiment, the encoder apparatus includes a network interface in data communication with one or more physical processors, the one or more physical processors comprising logic configured to: obtain content in a given projection; encode the content with the given projection along a default orientation; compute a rate distortion cost of encoding the content with the given projection along the default orientation; re-orient or rotate the content in a different orientation; encode the content with the given projection along the different orientation; compute a rate distortion cost of encoding the content with the given projection along the different orientation; compare the rate distortion cost of encoding the content with the given projection along the default orientation with the rate distortion cost of encoding the content with the given projection along the different orientation to find an orientation that takes a lowest rate distortion cost to encode the content; and provide the encoded content with the lowest rate distortion cost to the network interface.

In one variant, the one or more physical processors further includes logic configured to return the lowest rate distortion cost and provide the lowest rate distortion cost to a display device.

In another variant, the computed rate distortion cost includes a function of a number of bits used to encode an image and a measure of distortion.

In yet another variant, the computed rate distortion cost comprises a function of a peak signal-to-noise ratio, the function of the peak signal-to-noise ratio including a measure of mean square error.

In yet another variant, the given projection is selected from the group consisting of a cube projection, a hexahedron projection, an icosahedron projection, and an equirectangular projection.

In yet another variant, the logic is further configured to re-orient the content in a third orientation; encode the content with the given projection along the third orientation; compute a rate distortion cost of encoding the content with the given projection along the third orientation; and compare the rate distortion cost of encoding the content with the given projection along the third orientation with the rate distortion cost of encoding the content with the given projection along the default orientation and the rate distortion cost of encoding the content with the given projection along the different orientation in order to find the orientation that takes the lowest rate distortion cost to encode the content.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 9A-9C illustrate facet boundary adjustment based on content for use with any projection of the panoramic content, in accordance with some implementations of encoding methodology of the disclosure.

Figure 1A:
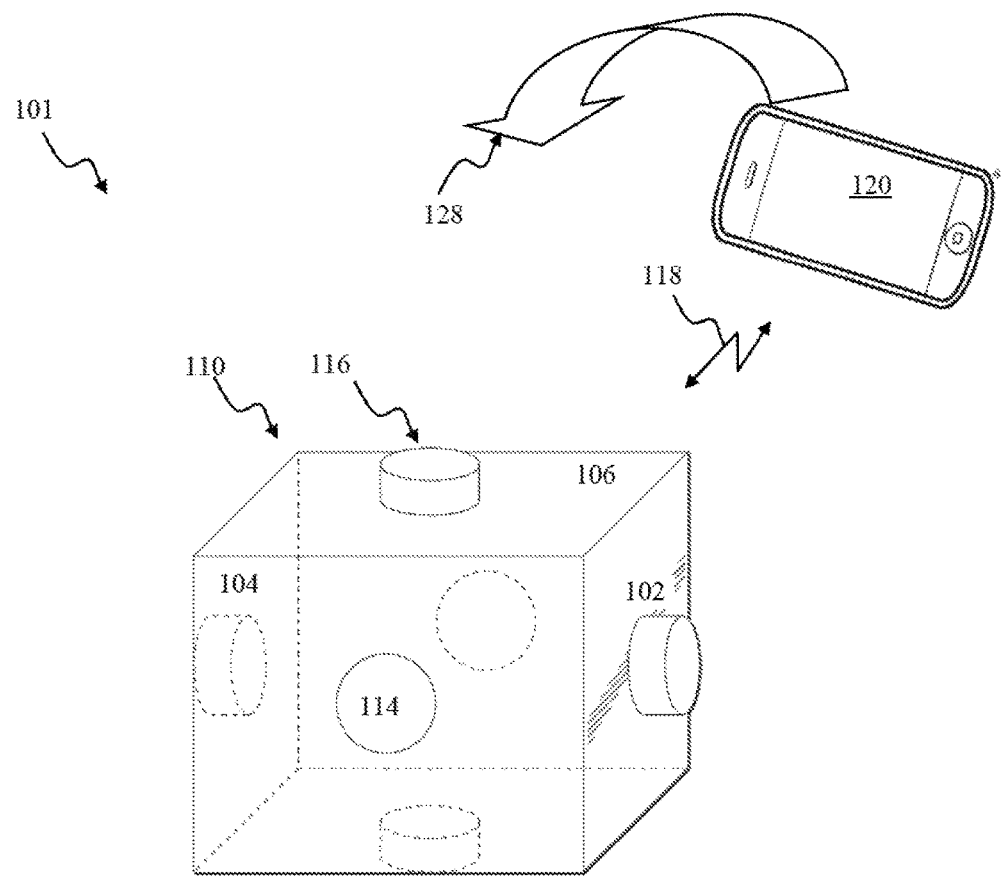
FIG. 1A is a functional block diagram illustrating a system for panoramic content capture and viewing in accordance with one implementation.

All Figures disclosed herein are © Copyright 2016-2017 GoPro Inc. All rights reserved.

DETAILED DESCRIPTION

Implementations of the present technology will now be described in detail with reference to the drawings, which are provided as illustrative examples, so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. For instance, the same ideas are also applicable to icosahedron or octahedron projections. Wherever convenient, the same reference numbers will be used throughout the drawings to refer to same or like parts.

Overview

Systems, methods, and apparatus for encoding panoramic imaging content are provided. Panoramic content (e.g., content captured using 120 degree, 180 degree, 360-degree view field, and/or other fields of view) and/or virtual reality (VR) content, may be characterized by high image resolution (e.g., 8192×4096 pixels at 90 frames per second (also called 8K resolution)) and/or high bit rates (e.g., up to 100 megabits per second (mbps)). Imaging content characterized by full circle coverage (e.g., 180°×360° or 360°×360° field of view) may be referred to as spherical content. Presently available standard video compression codecs, e.g., H.264 (described in ITU-T H.264 (January 2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC) (also known as H.265, described in e.g., ITU-T Study Group 16—Video Coding Experts Group (VCEG)—ITU-T H.265, and/or ISO/IEC JTC 1/SC 29/WG 11 Motion Picture Experts Group (MPEG)—publishes the HEVC standard as ISO/IEC 23008-2:2015, each of the foregoing incorporated herein by reference in its entirety), and/or the VP9 video codec, may prove non-optimal for distributing and decoding panoramic content on a resource limited devices.

Panoramic and/or virtual reality content may be presented by a client device. Some client devices (e.g., mobile phones, tablet computers, smart-watches, VR headsets) may be characterized by a limited resource budget. A resource limited device may be defined as a device that is limited by one or more of the following: 1) processing power 2) bandwidth 3) latency. When encoding, transmitting, decoding, and/or presenting panoramic and/or VR imaging content it may be of benefit to reduce encoded bitrate for a given quality level and/or achieve higher quality for a given bitrate.

Panoramic and or VR content may be characterized by variations in object motion, scene complexity through the capture and viewpoint orientation. When projecting images captured in a high curvature representation (e.g., spherical, fish-eye) to a flat representation (e.g., cube projection, ERP, equal area projection (EAP) and/or other flat representation, image distortion may occur. When projecting a sphere onto a cube, distortion may be greatest at locations on the sphere disposed most distant relative facets of the cube. To reduce effects of re-projection distortion when viewing a video, it may be of benefit to select projection parameters such that areas of greater distortion may be located at portions of the source image that may be easier to encode; areas of lower distortion may be places at locations in the source image that may be harder to encode.

Areas that are harder to encode may include areas that may (i) lie on motion boundaries; (ii) contain high spatial frequency features (e.g., texture, skyscraper buildings with many windows, checkered shirt, and/or other objects). Areas that are easier to encode may include areas that have low or no motion; areas of low high spatial frequency content (e.g., cloudless sky).

System and Apparatus—

FIG. 1A illustrates a capture system configured for acquiring panoramic content, in accordance with one implementation. The system 101 of FIG. 1A may include a capture apparatus 110, such as an action camera manufactured by the Assignee hereof (e.g., a GoPro device or the like, such as a HERO4 Silver), and/or other image/video capture devices.

The capture apparatus 110 may include for example 6-cameras (including, e.g., cameras 104, 106, 102) disposed in a cube-shaped cage chassis. The dimensions of the cage 121 may be selected between 25 mm and 150 mm, preferably 105 mm in some implementations. The chassis may be outfitted with a mounting port configured to enable attachment of the camera to a supporting structure (e.g., tripod, photo stick). The chassis may provide a rigid support structure. Use of a rigid structure may, inter alia, ensure that orientation of individual cameras with respect to one another may remain at a given configuration during operation of the apparatus 110. Greater number of cameras (e.g., compared to a single camera apparatus and/or a dual-camera system 100 of FIG. 1B) allows to reduce distortive lens effects (i.e., the source images may be anywhere from 90° to 120° FOV and rectilinear as opposed to wider spherical formats). As with images of the camera system 100 of FIG. 1B, the six (6) source images of FIG. 1A may be stitched to obtain images with a 360° FOV. The stitched image may be rendered in an equirectangular projection (ERP), cubic projection and/or other projection. The six (6) images may be combined to provide a full 360° FOV regardless of horizontal or vertical view angle.

Individual capture devices (e.g., camera 102 in FIG. 1A) may comprise a video camera device, such as described in, e.g., U.S. patent application Ser. No. 14/920,427 entitled "APPARATUS AND METHODS FOR EMBEDDING METADATA INTO VIDEO STREAM" filed on Oct. 22, 2015, the foregoing being incorporated herein by reference in its entirety.

Figure 1B:
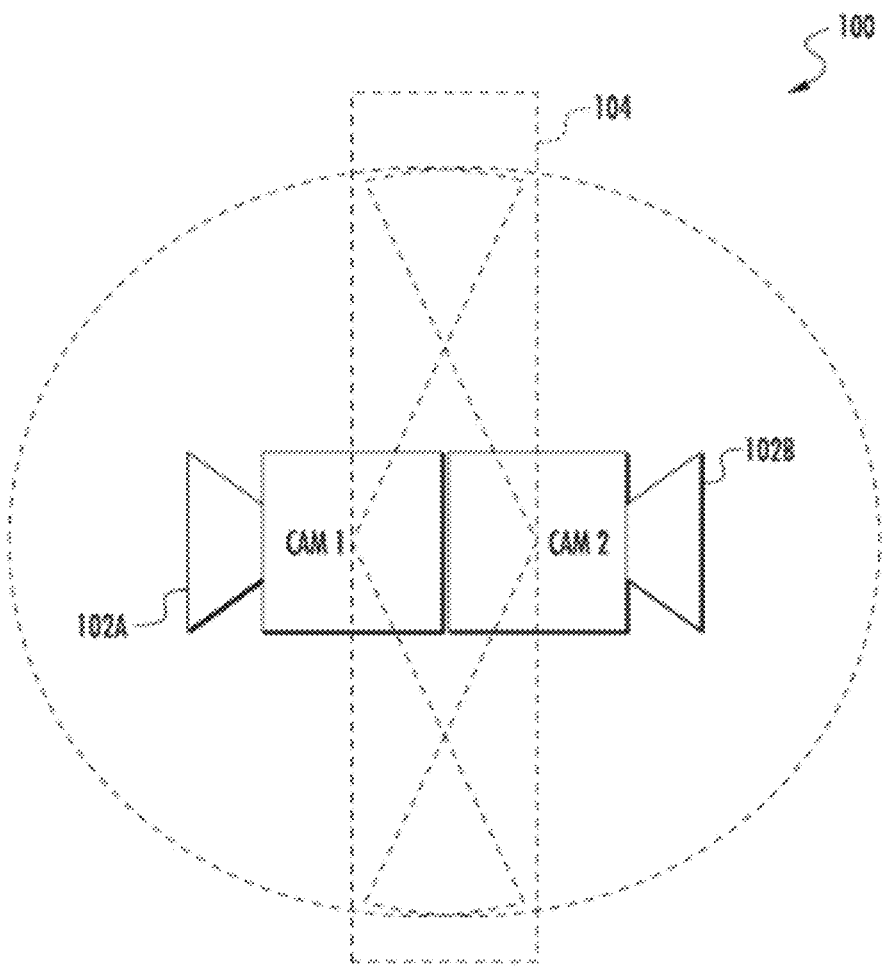
FIG. 1B is a graphical representation of one exemplary camera system including two (2) fisheye cameras useful in conjunction with the various aspects disclosed herein.

In some implementations, the capture device may include two (2) spherical (or "fish eye") cameras that are mounted in a back-to-back configuration (also commonly referred to as a "Janus" configuration), e.g., such as shown in FIG. 1B. As used herein, the term "camera" includes without limitations sensors capable of receiving electromagnetic radiation, whether in the visible band or otherwise (e.g., IR, UV), and producing image or other data relating thereto. The two (2) source images in a Janus configuration have a 180° or greater field of view (FOV); the resulting images may be stitched along a boundary between source images to obtain a panoramic image with a 360° FOV. The "boundary" in this case refers to the overlapping image data from the two (2) cameras. Stitching is necessary to reconcile differences between pixels of the source images introduced based on e.g., lighting, focus, positioning, lens distortions, color, etc. Stitching may stretch, shrink, replace, average, and/or reconstruct imaging data as a function of the input images. Janus camera systems are described in e.g., U.S. Design patent application Ser. No. 29/548,661, entitled "MULTI-LENS CAMERA" filed on Dec. 15, 2015, and U.S. patent application Ser. No. 15/057,896, entitled "UNIBODY DUAL-LENS MOUNT FOR A SPHERICAL CAMERA" filed on Mar. 1, 2016, which is incorporated herein by reference in its entirety.

Referring back to FIG. 1A, the capture apparatus 110 may be configured to obtain imaging content (e.g., images and/or video) with 360° field of view, also referred to as panoramic or spherical content, such as e.g., those shown and described in U.S. patent application Ser. No. 14/949,786, entitled "APPARATUS AND METHODS FOR IMAGE ALIGNMENT" filed on Nov. 23, 2015, and/or U.S. patent application Ser. No. 14/927,343, entitled "APPARATUS AND METHODS FOR ROLLING SHUTTER COMPENSATION FOR MULTI-CAMERA SYSTEMS", filed Oct. 29, 2015, each of the foregoing being incorporated herein by reference in its entirety. As described in the above-referenced applications, image orientation and/or pixel location may be obtained using camera motion sensor(s). Pixel location may be adjusted using camera motion information in order to correct for rolling shutter artifacts. As described in the above-referenced U.S. patent application Ser. No. 14/949,786 entitled "APPARATUS AND METHODS FOR IMAGE ALIGNMENT" and filed Nov. 23, 2015, images may be aligned in order to produce a seamless stitch in order to obtain the composite frame source. Source images may be characterized by a region of overlap. A disparity measure may be determined for pixels along a border region between the source images. A warp transformation may be determined using an optimizing process configured to determine displacement of pixels of the border region based on the disparity. Pixel displacement at a given location may be constrained in a direction that is tangential to an epipolar line corresponding to the location. A warp transformation may be propagated to pixels of the image. Spatial and/or temporal smoothing may be applied. In order to obtain an optimized solution, the warp transformation may be determined at multiple spatial scales.

In one exemplary embodiment, the individual cameras (e.g., cameras 102, 104, 106) may be characterized by a field of view, such as 120° in longitudinal dimension and 60° in latitudinal dimension. In order to provide for an increased overlap between images obtained with adjacent cameras, the image sensors of any two adjacent cameras may be configured to overlap a field of view of 60° with respect to one another. By way of a non-limiting illustration, the longitudinal dimension of a camera 102 sensor may be oriented at 60° with respect to the longitudinal dimension of the camera 104 sensor; the longitudinal dimension of camera 106 sensor may be oriented at 60° with respect to the longitudinal dimension of the camera 104 sensor. In this manner, the camera sensor configuration illustrated in FIG. 1A, may provide for 420° angular coverage in the vertical and/or horizontal planes. Overlap between multiple fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens, e.g., lens 114 of the camera 104, lens 116 of the camera 106. In some implementations, the individual lens may be characterized by what is referred to as a fisheye pattern and produce images characterized by a fish eye (or near-fish eye) field of view (FOV). Images captured by two or more individual cameras of the apparatus 110 may be combined using "stitching" of fisheye projections of captured images to produce an equirectangular planar image, in some implementations, such as shown in U.S. patent application Ser. No. 14/949,786 entitled "APPARATUS AND METHODS FOR IMAGE ALIGNMENT" and filed Nov. 23, 2015, incorporated supra. In some embodiments, wide angle images captured by two or more cameras may be directly stitched in some other projection, e.g., cubic or octahedron projection.

The capture apparatus 110 may house one or more internal metadata sources, e.g., video, inertial measurement unit or accelerometer, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on Oct. 22, 2015, incorporated supra. The capture apparatus 110 may comprise one or more optical elements e.g., the camera lenses 114 and 116. Individual optical elements may include, by way of non-limiting examples, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, polarized lens, other lens, and/or other optical elements.

The capture apparatus 110 may include one or more image sensors including, by way of non-limiting examples, one or more of charge-coupled device (CCD) sensor, active pixel sensor (APS), complementary metal-oxide semiconductor (CMOS) sensor, N-type metal-oxide-semiconductor (NMOS) sensor, and/or other image sensor. The capture apparatus 110 may include one or more microphones configured to provide audio information that may be associated with images being acquired by the image sensor.

The capture apparatus 110 may be interfaced to an external metadata source (e.g., GPS receiver, cycling computer, metadata puck, and/or other device configured to provide information related to system 101 and/or its environment) via a remote link. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementations, the capture apparatus 110 may be configured to provide panoramic content (or portion thereof) to the device 120 for viewing.

In one or more implementations, individual links 126, 118 may utilize any practical wireless interface configuration, e.g., Wi-Fi, Bluetooth (BT), cellular data link, ZigBee, Near Field Communications (NFC) link, e.g., using ISO/IEC 14443 protocol, IEEE Std. 802.15, 6LowPAN, Z-Wave, ANT+ link, and/or other wireless communications link. In some implementations, individual links 126, 118 may be effectuated using a wired interface, e.g., HDMI, USB, digital video interface, DisplayPort interface (e.g., digital display interface developed by the Video Electronics Standards Association (VESA), Ethernet, Thunderbolt), and/or other interface.

In some implementations (not shown), one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, accelerometer, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on Oct. 22, 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions; live preview video being captured for shot framing; mark key moments while recording with HiLight Tag; View HiLight Tags in GoPro Camera Roll for location and/or playback of video highlights; wirelessly control camera software; and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the relevant context, such as an activity (e.g., mountain biking) being captured. The user interface device 120 may communicate the settings to the camera apparatus 110.

A user may utilize the device 120 to view content acquired by the capture apparatus 110. Display of the device 120 may act as a viewport into the 3D space of the panoramic content that is captured. In some implementations, the user interface device 120 may communicate additional information (metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. For example, a user may rotate (sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo)), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation), and/or a combination thereof. By way of an illustration, two short button presses may initiate sensor metadata and/or video capture mode described in detail elsewhere; a single short button press may be used to (i) communicate initiation of video and/or photo capture and cessation of video and/or photo capture (toggle mode), or (ii) video and/or photo capture for a given time duration or number of frames (burst capture). It will be recognized by those skilled in the art that various user command communication implementations may be realized, e.g., short/long button presses.

For example, FIG. 1B depicts one exemplary camera system 100 that includes two (2) spherical (or "fish eye") cameras (102A, 102B) that are mounted in a back-to-back configuration (also commonly referred to as a "Janus" configuration). As used herein, the term "camera" includes without limitations sensors capable of receiving electromagnetic radiation, whether in the visible band or otherwise (e.g., IR, UV), and producing image or other data relating thereto. The two (2) source images in this example have a 180° or greater field of view (FOV); the resulting images may be stitched along a median 104 between the images to obtain a panoramic image with a 360° FOV. The "median" in this case refers to the overlapping image data from the two (2) cameras. Stitching is necessary to reconcile the differences introduced based on e.g., lighting, focus, positioning, lens distortions, color, etc. Stitching operations may stretch, shrink, replace, average, and/or reconstruct imaging data as a function of the input images. Janus camera systems are described in e.g., U.S. patent application Ser. No. 29/548,661, entitled "MULTI-LENS CAMERA" filed on Dec. 15, 2015, which is incorporated herein by reference in its entirety.

Other panoramic imaging formats may use a greater or fewer number of cameras along any number of viewing axis to support a variety of FOVs (e.g., 120°, 180°, 270°, 360°, etc.) For example, a four (4) camera system may provide 360° horizontal panorama with a 120° vertical range. Under certain conditions, a single camera may be used to catch multiple images at different views and times; these images may be stitched together to emulate a much wider FOV assembly. Still other camera rig configurations may use multiple cameras with varying degrees of overlapping FOV, so as to achieve other desirable effects (e.g., better reproduction quality, three dimensional (3D) stereoscopic viewing, etc.)

Panoramic content may be viewed on a normal or widescreen display; movement within the panoramic image may be simulated by "panning" through the content (horizontally, vertically, or some combination thereof), zooming into and out of the panorama, and in some cases stretching, warping, or otherwise distorting the panoramic image so as to give the illusion of a changing perspective and/or field of view. One such example of "warping" a viewing perspective is the so-called "little world" projection (which twists a rectilinear panorama into a polar coordinate system; creating a "little world"). Common applications for viewing panoramic content include without limitation: video games, geographical survey, computer aided design (CAD), and medical imaging. More recently, advances in consumer electronics devices have enabled varying degrees of hybrid realities, ranging on a continuum from complete virtual reality to e.g., augmented reality, mixed reality, mixed virtuality, and/or other content capture, presentation and/or viewing applications.

Figure 2:
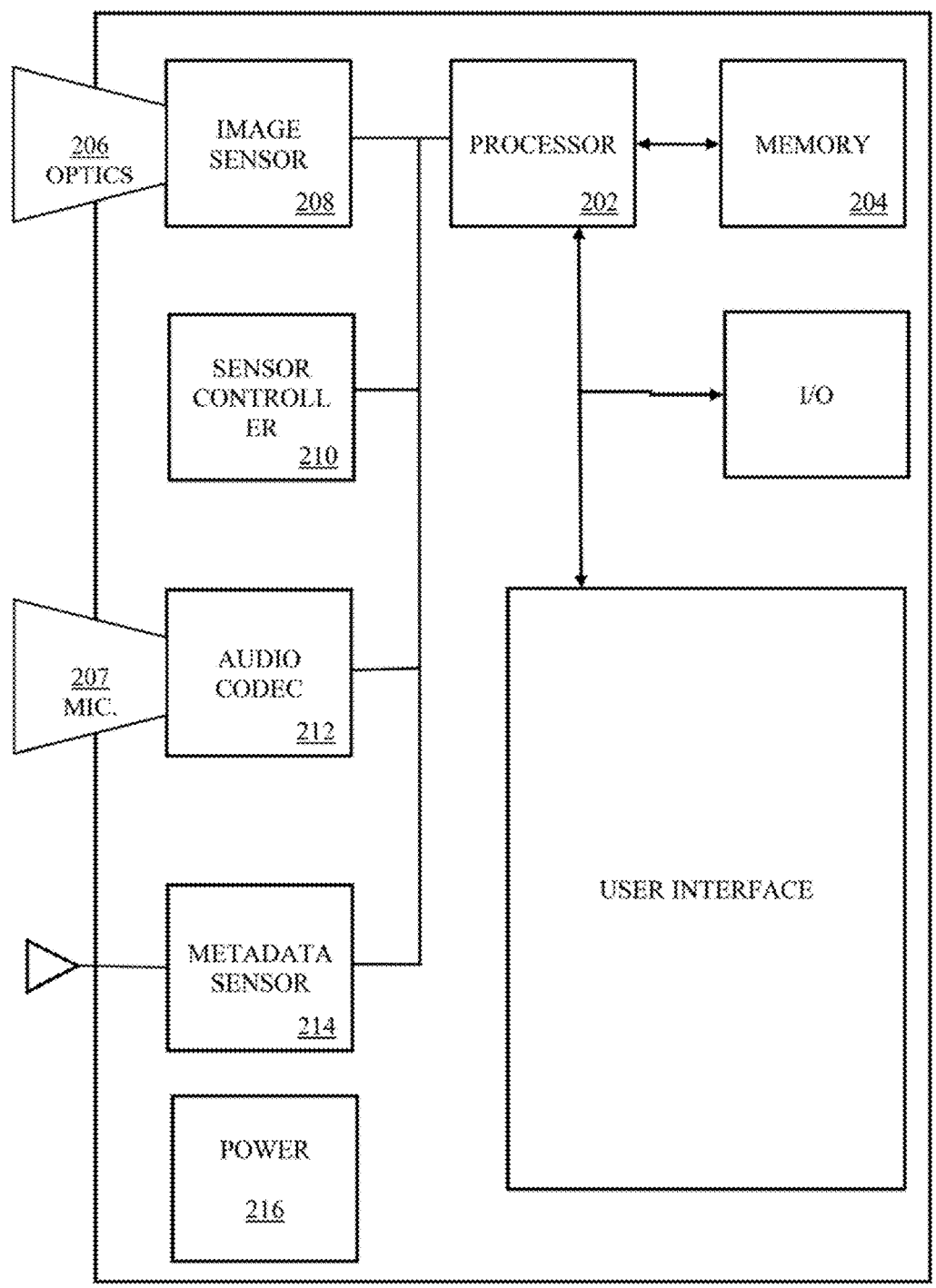
FIG. 2 is a functional block diagram illustrating a capture device for use with, e.g., the system of FIG. 1A in accordance with one implementation.

FIG. 2 illustrates one generalized implementation of an apparatus 200 for storing and/or rendering content of interest based on an original image and/or pre-fetched boundary content. The apparatus 200 of FIG. 2 may include one or more processors 202 (such as system on a chip (SOC), microcontroller, microprocessor, central processing unit (CPU), digital signal processor (DSP), application specific integrated circuit (ASIC), general processing unit (GPU), and/or other processors) that control the operation and functionality of the display device 200. In some implementations, the apparatus 200 FIG. may correspond to a VR head set or a consumer electronics device (e.g., a smart phone, tablet, PC, etc.) configured to capture, store, and/or render VR and VR-like content.

The apparatus 200 may include electronic storage 204. The electronic storage 204 may include a non-transitory system memory module that is configured to store executable computer instructions that, when executed by the processor(s) 202, perform various device functionalities including those described herein. The electronic storage 204 may also include storage memory configured to store content (e.g., metadata, images, audio) captured by the apparatus 200.

In one such exemplary embodiment, the electronic storage 204 may include non-transitory memory configured to store configuration information and/or processing code to capture, store, retrieve, and/or render, e.g., video information, metadata and/or to produce a multimedia stream including, e.g., a video track and metadata in accordance with the methodology of the present disclosure. In one or more implementations, the processing configuration may be further parameterized according to, without limitation: capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 200. The processor 202 may interface to the sensor controller module 200 in order to obtain and process sensory information for, e.g., object detection, face tracking, stereo vision, and/or other tasks.

In one exemplary embodiment, the electronic storage 204 may further include instructions which when executed by the processor 202 encode and/or decode images from multiple optics modules 206 that exploit content continuity between facets, such as in the case of encoding/decoding cube-projected images. In some such variants, one facet may be encoded/decoded independently from other facets to obtain a seed facet. Additional transformed versions of the seed facet may be generated according to known geometric relationships between the various facets of the optics modules 206; e.g., one corresponding to a 90° counterclockwise rotation, another to a 90° clockwise rotation, and one to a 180° rotation. Transformed versions may be used to form an augmented image. The remaining facets of the optics modules 206 may be encoded using transformed versions within the augmented image.

The apparatus 200 may include one or more optics modules 206. In one or more implementations, the optics module 206 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the optics module 206 may implement focus controller functionality configured to control the operation and configuration of the camera lens. The optics module 206 may receive light from an object and couple received light to an image sensor 208. The image sensor 208 may include, by way of non-limiting example, one or more of charge-coupled device sensor, active pixel sensor, complementary metal-oxide semiconductor sensor, N-type metal-oxide-semiconductor sensor, and/or other image sensor. The image sensor 208 may be configured to capture light waves gathered by the optics module 206 and to produce image(s) data based on control signals from the sensor controller module 210 (described below). The optics module 208 may include a focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 208 may include, without limitation, video sensors, audio sensors, capacitive sensors, radio sensors, accelerometers, vibrational sensors, ultrasonic sensors, infrared sensors, radar, LIDAR and/or sonars, and/or other sensory devices.

The apparatus 200 may include one or more audio components 212 e.g., microphone(s) and/or speaker(s). The microphone(s) may provide audio content information. Speakers may reproduce audio content information.

The apparatus 200 may include a sensor controller module 210. The sensor controller module 210 may be used to operate the image sensor 208. The sensor controller module 210 may receive image or video input from the image sensor 208; audio information from one or more microphones, such as 212. In some implementations, audio information may be encoded using audio coding format, e.g., AAC, AC3, MP3, linear PCM, MPEG-H and or other audio coding format (audio codec). In one or more implementations of "surround" based experiential capture, multi-dimensional audio may complement e.g., panoramic or spherical video; for example, the audio codec may include a stereo and/or 3-dimensional audio codec.

The apparatus 200 may include one or more metadata modules 214 embodied within the housing and/or disposed externally to the apparatus. The processor 202 may interface to the sensor controller 210 and/or one or more metadata modules. Each metadata module 214 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other environmental sensors. The apparatus 200 may contain one or more other metadata/telemetry sources, e.g., image sensor parameters, battery monitor, storage parameters, and/or other information related to camera operation and/or capture of content. Each metadata module 214 may obtain information related to environment of the capture device and an aspect in which the content is captured and/or to be rendered.

By way of a non-limiting example: (i) an accelerometer may provide device motion information, including velocity and/or acceleration vectors representative of motion of the apparatus 200; (ii) a gyroscope may provide orientation information describing the orientation of the apparatus 200; (iii) a GPS sensor may provide GPS coordinates, and time, that identify the location of the apparatus 200; and (iv) an altimeter may provide the altitude of the apparatus 200. In some implementations, the metadata module 214 may be rigidly coupled to the apparatus 200 housing such that any motion, orientation or change in location experienced by the apparatus 200 is also experienced by the metadata sensors 214. The sensor controller module 210 and/or processor 202 may be operable to synchronize various types of information received from the metadata sources 214. For example, timing information may be associated with the sensor data. Using the timing information metadata information may be related to content (photo/video) captured by the image sensor 208. In some implementations, the metadata capture may be decoupled from video/image capture. That is, metadata may be stored before, after, and in-between one or more video clips and/or images. In one or more implementations, the sensor controller module 210 and/or the processor 202 may perform operations on the received metadata to generate additional metadata information. For example, a microcontroller may integrate received acceleration information to determine a velocity profile of the apparatus 200 during the recording of a video. In some implementations, video information may consist of multiple frames of pixels using any applicable encoding method (e.g., H262, H.264, Cineform® and/or other standard).

Embodiments of either the camera systems and/or hybrid reality viewers may interface with external interfaces to provide external metadata (e.g., GPS receivers, cycling computers, metadata pucks, and/or other devices configured to provide information related to the device and/or its environment) via a remote link. The remote link may interface to an external user interface device. In some implementations, the remote user interface device may correspond to a smart phone, a tablet computer, a phablet, a smart watch, a portable computer, and/or other device configured to receive user input and communicate information. Common examples of wireless link interfaces include, without limitation e.g., WiFi, Bluetooth (BT), cellular data link, ZigBee, near field communications (NFC) link, ANT+ link, and/or other wireless communications link. Common examples of a wired interface include without limitation e.g., HDMI, USB, DVI, DisplayPort, Ethernet, Thunderbolt, and/or other wired communications links.

The user interface device may operate a software application (e.g., GoPro Studio, GoPro App, and/or other software applications) configured to perform a variety of operations related to camera configuration, control of video acquisition, and/or display of video. For example, some applications (e.g., GoPro App) may enable a user to create short video clips and share clips to a cloud service (e.g., Instagram, Facebook, YouTube, Dropbox); perform full remote control of the device, preview video being captured for shot framing, mark key moments while recording (e.g., with HiLight Tag), view key moments (e.g., View HiLight Tags in GoPro Camera Roll) for location and/or playback of video highlights, control device software, and/or perform other functions.

The apparatus 200 may also include user interface (UI) module 216. The UI module 216 may include any type of device capable of registering inputs from and/or communicating outputs to a user. These may include, without limitation, display, touch, proximity sensitive interface, light, sound receiving/emitting devices, wired/wireless input devices and/or other devices. The UI module 216 may include a display, one or more tactile elements (e.g., buttons and/or virtual touch screen buttons), lights (light emitting diode (LED)), speaker, and/or other UI elements. The UI module 216 may be operable to receive user input and/or provide information to a user related to operation of the apparatus 200.

In one exemplary embodiment, the UI module 216 is a head mounted display (HMD). HMDs may also include one (monocular) or two (binocular) display components which are mounted to a helmet, glasses, or other wearable article, such that the display component(s) are aligned to the user's eyes. In some cases, the HMD may also include one or more cameras, speakers, microphones, and/or tactile feedback (vibrators, rumble pads). Generally, HMD's are configured to provide an immersive user experience within a virtual reality, augmented reality, or modulated reality. Various other wearable UI apparatuses (e.g., wrist mounted, shoulder mounted, hip mounted, etc.) are readily appreciated by artisans of ordinary skill in the related arts, the foregoing being purely illustrative.

In one such variant, the one or more display components are configured to receive faceted image content and exploit the image content continuity between facets for display. For example, a seed facet may be decoded first and transformed according to various rotations (e.g., a 90° counterclockwise rotation, another to a 90° clockwise rotation, and a 180° rotation). The transformed versions may be used to assist in decoding the remaining facets of the image. The facets may then be stitched and/or projected together to obtain a full panoramic view or other wide field of view.

The I/O interface module 218 of the apparatus 200 may include one or more connections to external computerized devices to allow for, inter alia, content delivery and/or management of the apparatus 200. The connections may include any of the wireless or wireline interfaces discussed above, and further may include customized or proprietary connections for specific applications. In some implementations, the communications interface may include a component (e.g., a dongle), including an infrared sensor, a radio frequency antenna, ultrasonic transducer, and/or other communications interfaces. In one or more implementation, the communications interface may include a local (e.g., Bluetooth, Wi-Fi) and/or broad range (e.g., cellular LTE) communications interface configured to enable communications between the apparatus 200 and an external content source (e.g., a content delivery network).

The apparatus 200 may include a power system 216 that may be tailored to the needs of the application of the device. For example, for a small-sized lower power action camera, a wireless power solution (e.g. battery, solar cell, inductive (contactless) power source, and/or other power systems.) may be used.

Figure 3:
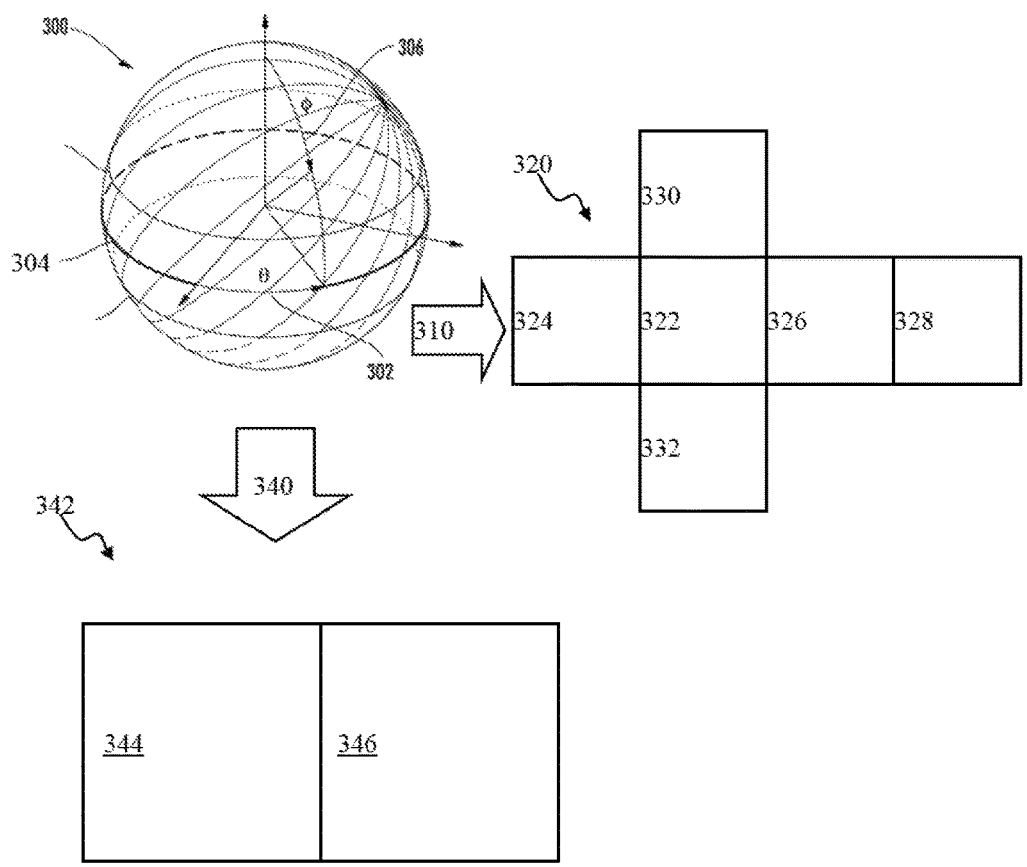
FIG. 3 is a graphical illustration depicting spherical to cube image projection, in accordance with one implementation.

FIG. 3 illustrates spherical coordinate system 300 useful for characterizing image transformation of the disclosure in accordance with one implementation. Spherical angle θ, denoted by arrow 302 in FIG. 3 may be used to denote location of a pixel along the iso-line 304 in FIG. 3 (also called Yaw). Spherical angle φ, denoted by arrow 306 in FIG. 3 may be used to denote a location away from the equator 304 (also called pitch). It will be appreciated that while the exemplary implementation(s) described herein are discussed in terms of a spherical coordinate system, other coordinate systems may be utilized consistent with the disclosure for certain functions, including without limitation Cartesian, polar, and cylindrical coordinate systems.

In some implementations, a representation of the environment may be mapped onto a projection, including for example cubic projection 320 as shown in FIG. 3. Some projections may include spherical to cube mapping denoted by arrow 310 in FIG. 3. In one or more implementations, the cube projection may be obtained by, e.g., assigning the output of individual cameras of apparatus 110 of FIG. 1A to a respective facet of projection 320. By way of an illustration, the output of forward looking camera 102 may be assigned to facet 322, the output of upward looking camera 116 may be assigned to facet 330, the output of camera 104 to facet 326, the output of other cameras of the apparatus 130 may be assigned to respective facets 324, 328, 332.

Figure 4A:
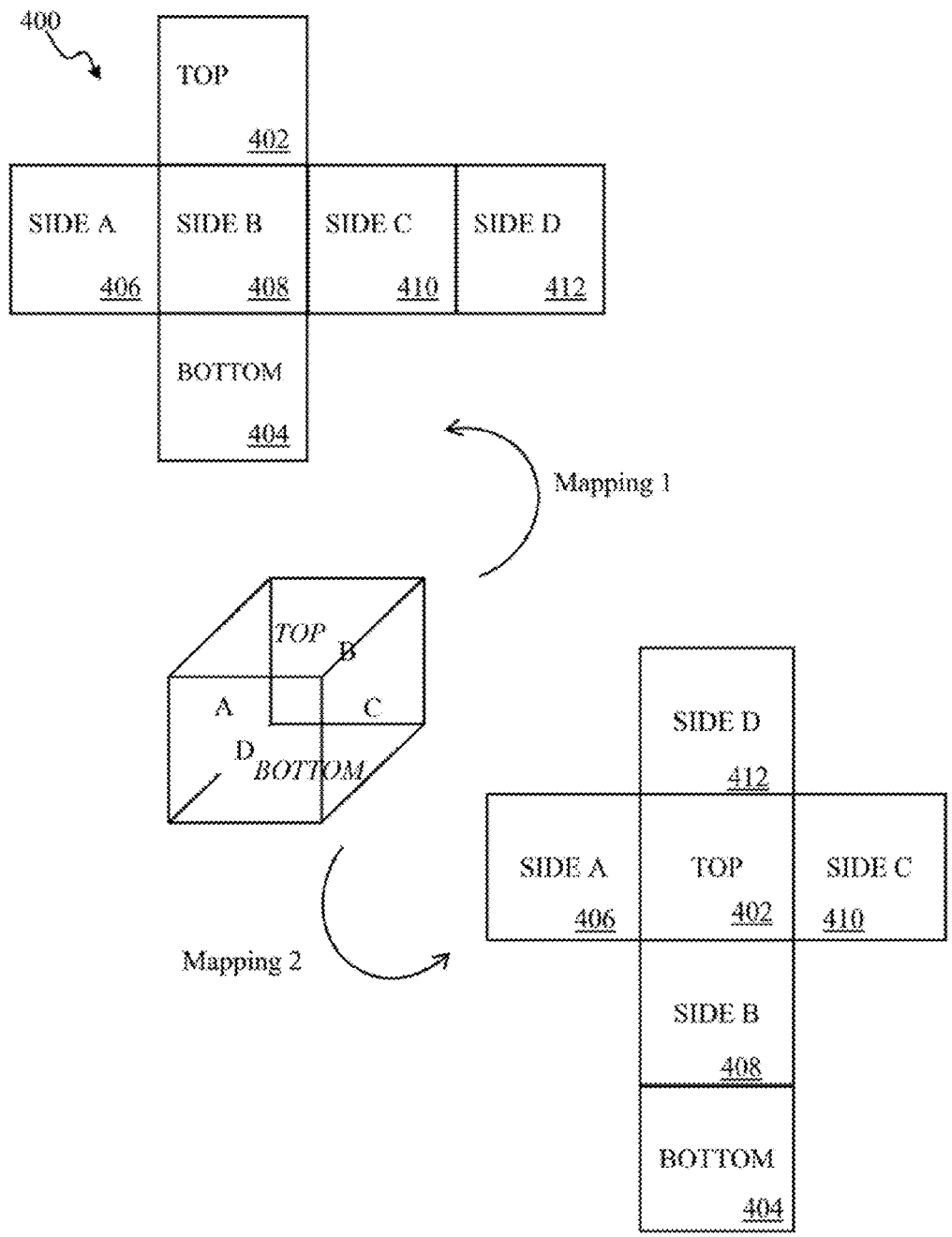
FIG. 4A is a graphical illustration depicting an exemplary cube projection of a panoramic image for use with encoding methodology of the disclosure, in accordance with one implementation.

In some implementations, cube projection of visual environment may be obtained in accordance with configuration of FIG. 4A, wherein the top facet (e.g., upward looking view) may be placed at the top of the projection (e.g., facet 410 in FIG. 4A). In one or more implementations, the up view may be placed in the middle facet. Other implementations may place the up view on a particular side facet. Still other orientations and views may be used consistent with the various principles described herein, the foregoing being purely illustrative.

Returning to FIG. 3, in one or more implementations, a representation of the environment may be mapped into an equirectangular projection (ERP) 342. In some implementations of image capture with dual-lens cameras, the ERP may be obtained by, e.g., assigning the output of individual cameras of apparatus 100 of FIG. 1B to a respective portion of projection 342. By way of an illustration, the output of forward looking camera 102 may be assigned to portion 344, the output of rearward looking camera may be assigned to portion 346. In a variant (not shown), the output of rearward looking camera may be segmented (e.g., into equal halves) with each of the segmented portions being disposed adjacent to opposing sides of the output of the forward looking camera (e.g., portion 344), In some implementations, ERP image may be obtained using image stitching methodology described in, e.g., U.S. patent application Ser. No. 15/234,869, entitled "Equatorial Stitching of Hemispherical Images in a Spherical Image Capture System" filed on Aug. 11, 2016, and/or image alignment methodology described in, e.g., U.S. patent application Ser. No. 14/949,786, entitled "APPARATUS AND METHODS FOR IMAGE ALIGNMENT" filed on Nov. 23, 2015, each of the foregoing being incorporated herein by reference in its entirety.

By way of an illustration of image content capture using six-camera device, the output of individual cameras of the device 110 of FIG. 1A may be projected onto equirectangular plane using mapping described in, e.g., FIG. 5 of U.S. patent application Ser. No. 14/927,343, entitled "APPARATUS AND METHODS FOR ROLLING SHUTTER COMPENSATION FOR MULTI-CAMERA SYSTEMS", filed Oct. 29, 2015, the foregoing being incorporated herein by reference in its entirety.

Figure 4B:
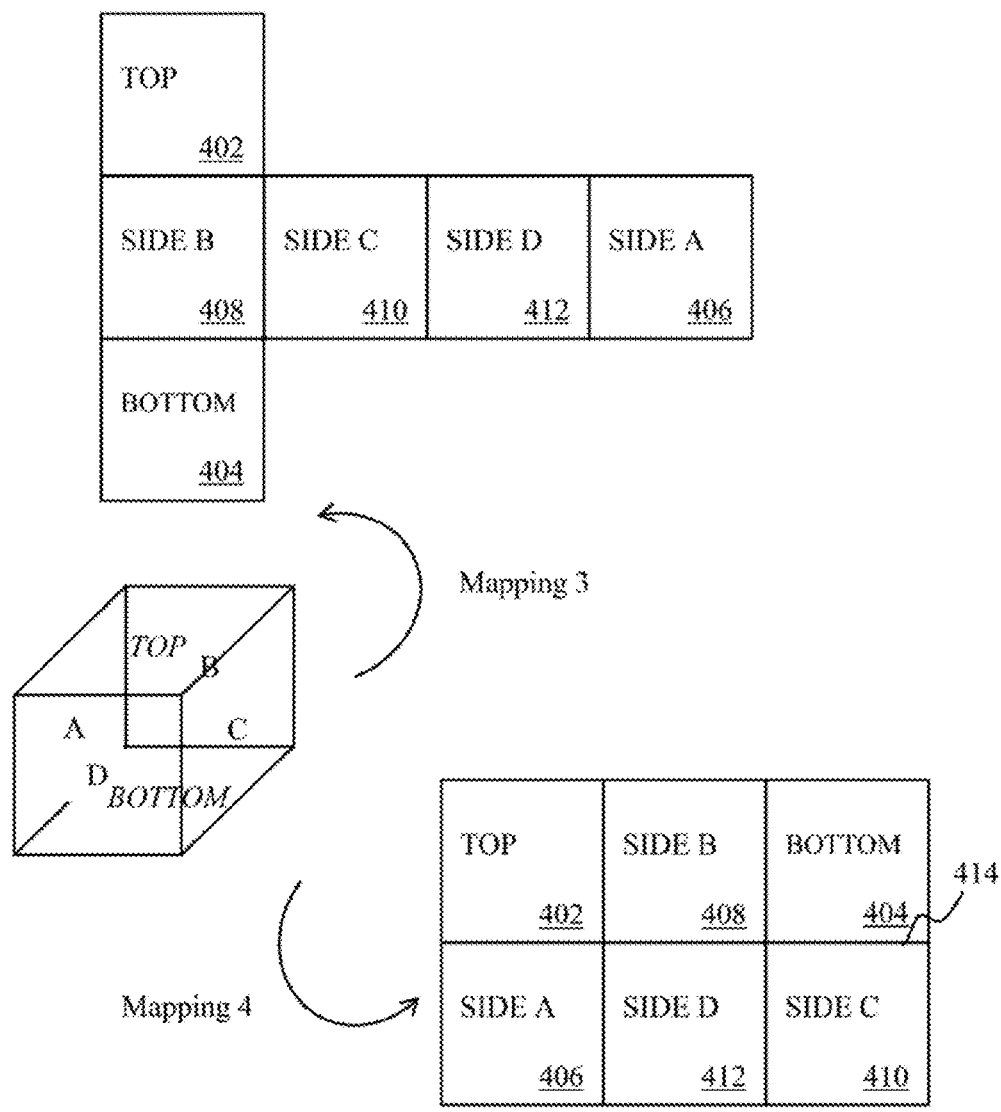
FIG. 4B is a graphical illustration depicting an exemplary augmented image obtained on components of the cube projection of FIG. 4A, in accordance with one implementation.

FIGS. 4A-4B illustrate several exemplary facet packing arrangements of cubic projection configurations for use with the encoding methodology of the disclosure, in accordance with one implementation. As shown in FIG. 4A, a cube projection of the visual environment may include: a top facet 402, a bottom facet 404, and four (4) side facets (facet A 406, facet B 408, facet C 410, facet D 412). The arrangement of these facets may be arranged in any number of mappings (of which two (2) are shown). Under a first mapping, the top facet (e.g., upward looking view) is placed at the top of the projection 400. Under a second mapping, the top facet may be placed in the middle. While other mappings may be used, the identified mappings are described for various encoding efficiency improvements. In particular, when the cubic projection is encoded within the equirectangular format (e.g., under HEVC H.264 encodings), the facet mapping may affect encoding efficiencies. It will be recognized by those skilled in the arts that various other configurations of cube projection may be utilized consistent with the present disclosure. An encoder may be configured to adaptively select a given facet packing configuration for a given frame (image), for GOP, and/or a sequence of frames (images) corresponding to a given scene. For example, in other use scenarios, a top facet may not be the primary view of interest (e.g., a blue sky, a ceiling, etc.), and a forward facing camera may be preferred.

As shown in FIG. 4B, facets of the cube projection may be configured using another mapping in a T configuration wherein facets 402, 408, 404 may be configured in a column so as to provide scene continuity across boundaries (e.g., horizontal boundary between the facet 402, and 408; and horizontal boundary between the facet 408 and 404). Such scene continuity may facilitate intra-frame prediction and/or provide for greater encoding efficiency and/or lower encoded bitrate when encoding facets 402, 408, 404 using e.g., H.264, HEVC, and/or other encoder configured for intra-frame prediction. Facets 410, 412, 406 may be configured in a row such that to provide visual scene continuity across boundaries (e.g., vertical boundary between the facet 410, and 412; and vertical boundary between the facet 412 and 406). The column/row T-shaped configuration of FIG. 4B may further provide for visual scene continuity across a vertical boundary between the facet 408, and 410. Such scene continuity may facilitate intra-frame prediction and/or provide for greater encoding efficiency and/or lower encoded bitrate when encoding facets 410, 412, 406 using e.g., H.264, HEVC, and/or other encoder configured for intra-frame prediction.

As shown in FIG. 4B, facets of the cube projection may be configured in a 3×2 configuration using a fourth mapping. As used herein when describing facet packing, the first index (3) may denote number of columns (or rows); the second index (2 n FIG. 4B) may denote number of rows/columns. The 3×2 configuration may correspond to rows of facets including facets 402, 408, 404 and a row including facets 406, 412, 410. Configuring facets in rows may provide for scene continuity across vertical facet boundaries (e.g., boundaries between the facet 402 and facet 408, facet 408 and facet 404; facet 406 and facet 412 and facet 412 and facet 410. It is noteworthy that visual scene discontinuity may occur between facets of different rows, e.g., across row boundary 414. The 3×2 facet configuration obtained using the fourth mapping may provide for efficient memory utilization when packing, encoding, storing, and/or transmitting cube map projection.

The row-wise 3×2 facet packing configuration of FIG. 4B may be augmented. In some implementations, one or more rows and/or columns may be added to obtain 4×2, 5×2, 3×3, 4×4, 4×3, 5×3, 4×4, 5×4 and/or other packing configurations. By way of an illustration, the facet 408 may be disposed to the left of facet 408 to provide visual scene continuity across the vertical boundary and facilitate intra-frame encoding of the facet 406. Facet 404 may be disposed below facet 408 to provide visual scene continuity across the horizontal boundary and facilitate intra-frame encoding of the facet 406. A facet (e.g., 412) may be disposed above facet 402 to provide visual scene continuity across the horizontal boundary and facilitate intra-frame encoding of the facet 402. An encoder may be configured to adaptively select facet packing configuration (e.g., such as described herein) for a given frame (image), for GOP, and/or a sequence of frames (images) corresponding to a given scene.

Figure 4C:
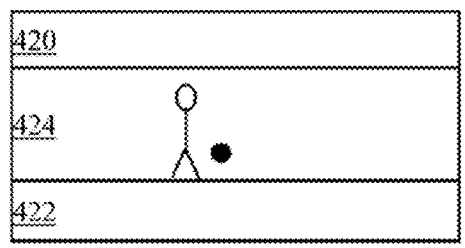
FIG. 4C is a graphical illustration depicting evaluation an image in equirectangular projection used for projection selection, in accordance with one implementation.

FIGS. 4C-4F illustrate encoding of panoramic images using projection selection methodology of the disclosure. FIG. 4C illustrates an ERP that may be used to project source spherical content, e.g., such as described with respect to FIG. 3. Source content may be obtained by a moving capture apparatus (e.g., 110). When capturing content indoors (e.g., in a gym/stadium during a basketball game) using a mobile capture device, motion may be present in the top portion (420 in FIG. 4C) of the image e.g., due to ceiling structure; and/or bottom portion 422 of the image due to, e.g., floor pattern/texture. Some regions of the middle image portion 424 may include moving objects (e.g., player and/or ball). When capturing content outdoors and/or using stationary camera upper image portion 420 may contain less motion and/or texture (e.g., sky), while central portion 424 may include motion and/or texture (e.g., trees, rotating camera). Selecting a target projection such as to match difficult to encode areas (e.g., areas of high motion, texture) to areas with less distortion due to projection (e.g., areas where a distance between the surface of the sphere and the surface of the projection is smallest) may enable one to encode content at a reduced rate distortion (RD) cost. Reducing rate distortion may provide for a lower encoded bitrate for a given quality and/or increased quality for a given bitrate.

Figure 4D:
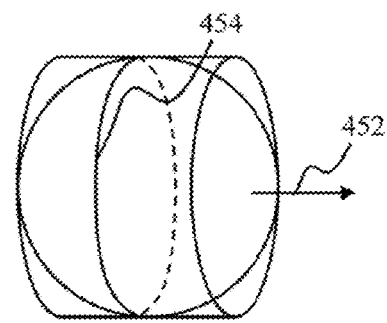
FIGS. 4D-4F are graphical illustration depicting various exemplary projections of a spherical image, in accordance with one implementation.
Figure 4E:
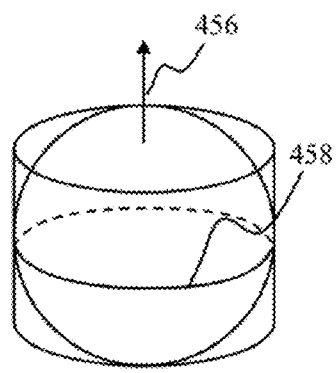
Figure 4F:
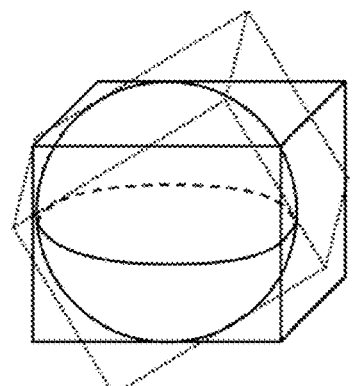

FIGS. 4D-4F illustrate various target image representation (of projection configuration) that may be selected using information about contents of the source image. As used herein term image representation and/or projection configuration may be used to describe a given projection (e.g., Equirectangular, cube map, equal area, octahedron, icosahedral, cubic pyramid, and/or other projection) and/or projection orientation (e.g., axis orientation) that may unambiguously describe projection.

FIG. 4D illustrates horizontally oriented cylindrical (ER) projection that may be used for projecting source spherical images with high motion and/or high frequency (texture) content in the top and/or bottom portions of the source image (e.g., indoor sports shots). Main axis of the cylindrical projection 452 may be oriented horizontally such that mid-point portion (indicated by line 454) of the cylinder may be disposed proximate vertical meridian of the sphere. Projection configuration of FIG. 4D may provide for lower distortion in the top and bottom areas of equirectangular image and used to project content characterized by high motion and/or high frequency content in the top and/or bottom portions of the source image.

FIG. 4E illustrates vertically oriented cylindrical projection that may be used for projecting source spherical images with lo and/or absent motion and/or high frequency (texture) content in the top and/or bottom portions of the source image (e.g., outdoor shots, fixed-mounted cameras). Main axis of the cylindrical projection 456 may be oriented horizontally such that mid-point portion (indicated by line 454) of the cylinder may be disposed proximate horizontal meridian (equator) of the sphere. Projection configuration of FIG. 4E may provide for lower distortion in the middle area (e.g., 424 in FIG. 4C of equirectangular image and used to project content characterized by high motion and/or high frequency content in the top and/or bottom portions of the source image.

FIG. 4F illustrates various three-dimensional configuration of a cube projection relative spherical projection. When selecting a given cube projection configuration, cube vertices may be places proximate portions of the spherical content which may be easier to encode (e.g., containing lower motion and/or lower high frequency content) in order to reduce rate distortion cost. Although cube projection has been used to illustrate encoding of panoramic images, applications of the present disclosure are not so limited and other multi-faceted projections of a spherical image may be used. In some implementations, facets of a tetrahedron, octahedron, icosahedron and/or other polyhedron projection may be arranged such as to minimize across facet pixel discontinuity, e.g., using methodology described herein. By way of an illustration, one or more triangular facets of tetrahedron, octahedron, or icosahedron may be rotated by 120° in order to reduce object discontinuity across facets. It will be appreciated by those skilled in the arts that other projection configurations may be utilized with the methodology described herein, such as tetrahedral, rectangular pyramid, and/or other polyhedron projections that may include two or more facets.

In some implementations, projection orientation (e.g., cube projection) may be selected such that cube facet boundaries may be selected such that one or more representation of an object may be within a given facet. Placing an object within a given facet may result in better encoding performance (e.g., as judged based on a combination of lower encoding time, greater encoded quality, lower number of bits). Encoding of an object and/or a feature that may be disposed within a facet may advantageously produce fewer artifacts for given configuration of encoding parameters (e.g., macroblock, QP, bitrate, and/or other parameters).

In some implementations, facet boundary determination may be performed adaptively when a camera is in motion and/or an object is in motion with respect to the camera (or both).

Image encoding using projection selection methodology may be utilized with a variety of capture device configurations e.g., single wide angle lens (e.g., with FOV greater than 120°) camera, dual-lens camera (e.g., cameras that are mounted in a back-to-back configuration (also commonly referred to as a "Janus" configuration); six lens capture apparatus (e.g., 110 of FIG. 1A), and or other camera configurations. By way of an illustration of encoding images obtained with a dual-lens camera. In some implementations, source images (e.g., front/back) may be stitched to obtain spherical image. Content of the spherical image may be analyzed in order to detect presence and/or position of one or more objects. A cube projection mapping (e.g. location of boundaries 912, 914, 916 of facets in FIG. 9B) may be configured based on object presence and/or location in the spherical image. Spherical images may be projected onto the cube mapping. Cube projections may be encoded using HEVC and/or other codecs. Encoded bitstreams for one or more facets of the cube projection may be stored and/or delivered for viewing. Received bitstreams may be decoded by e.g., a user interface device 120 and presented. In some implementations, stitching operations may be performed after decoding. When viewing content on a viewport that may be disposed away from lens boundaries (e.g., straight ahead in a dual front/back lens capture configuration) the stitching operation may be altogether omitted.

FIGS. 9A-9C illustrate adjustment of projection facet boundary based on content for use with cube projection of panoramic content, in accordance with some implementations of encoding methodology of the disclosure. FIG. 9A may represent a facet that may include a representation of a skier 1004 taken at time t1 moving in a direction denoted by arrow 1008 along a mountain slope. Lines 1002, 1006 denote boundaries of the facet. FIG. 9B may represent contents taken at time t2>t1. Line 1012 may represent a facet boundary. As may be seen from FIG. 9B, the facet boundary may fall through an object/skier. Encoding the skier across a facet boundary may produce encoding artifacts. Using skier motion information (e.g., obtained by object tracking using images of the video) and/or camera motion information (obtained using. e.g., camera motion sensor such as IMU) the facet of the projection may be positioned such as not to slice across an object of interest, e.g., the skier. FIG. 9C illustrates adaptively placing a facet boundary at location 1022. Additionally, an overlap region can be used to detect parallax and as a result, a relative distance of objects from the camera. By using this distance information, the facets of a projection can be positioned such that they lie on objects that are farthest from the camera (and not moving).

Figure 6:
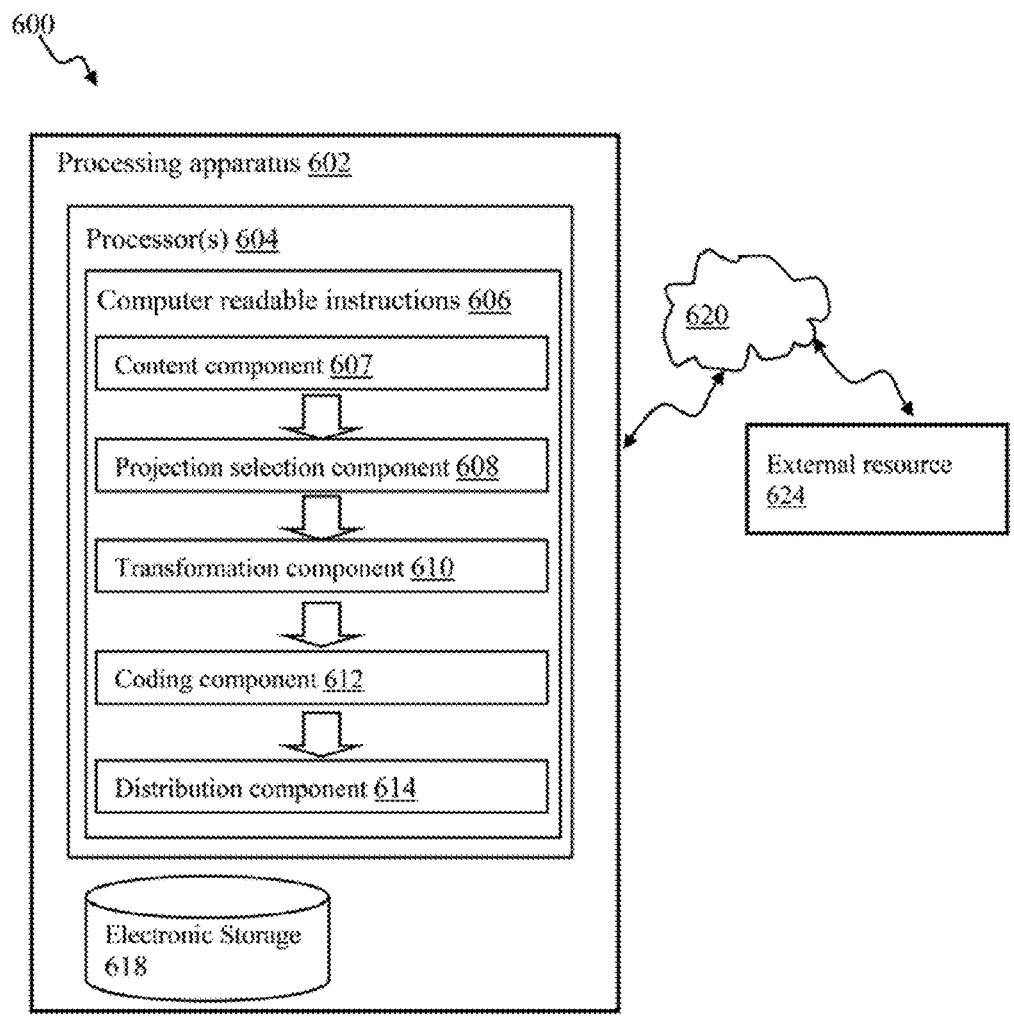
FIG. 6 is a functional block diagram illustrating a system for providing content using projection selection methodology of the disclosure, in accordance with one implementation.

FIG. 6 illustrates a computerized system for encoding and/or decoding of imaging content using methodology of the disclosure, in accordance with one implementation. In some implementations, the system 600 may be configured to provide encoded content during content acquisition by a capture device (e.g., 110 of FIG. 1A). In one or more implementations, the system 600 may be configured to encode previously acquired content.

The system 600 of FIG. 6 may include a processing apparatus 602 (e.g., including capture device 110 of FIG. 1A, 100 of FIG. 1B, an encoder of FIG. 5A, a decoder of FIG. 5B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The processing apparatus 602 may be in operable communication with one or more remote client devices via one or more data communication interfaces which are coupled to a network 620. The one or more data communication interfaces in communications with the network 620 may include one or more wired interfaces (e.g., serial, USB, Thunderbolt™, HDMI, Ethernet, and/or other wired interfaces) and/or wireless interfaces (e.g., Wi-Fi, Bluetooth, cellular, and/or other interfaces). For example, such electronic communication links may be established, at least in part, via one or more networks. In some implementations, the network 620 may comprise the Internet and/or may employ other communications technologies and/or protocols. By way of non-limiting example, the interface may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the interface may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface may be represented using formats including one or more of hypertext markup language (HTML), extensible markup language (XML), and/or other formats. One or more exchanges of information between entities of system 600 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The processing apparatus 602 may communicate with (e.g., provide content to) a remote entity. The remote entity may include a user interface device, one or more of a portable communications device (e.g., smartphone, a tablet computer, a laptop computer), a desktop computer, a television set-top box, smart TV, a gaming console, a client computing platform, and/or other platforms), a server, a cable television network node, a cellular data network node, and/or other entity configured to communicate information with the apparatus 602. In some implementations, the system 600 may interface with one or more capture devices, e.g., configured for obtaining panoramic content such as described in U.S. patent application Ser. No. 14/927,343 entitled "APPARATUS AND METHODS FOR ROLLING SHUTTER COMPENSATION FOR MULTI-CAMERA SYSTEMS" filed on Oct. 29, 2015, incorporated supra.

The processing apparatus 602 may include one or more physical processors 604 configured by machine-readable instructions 606 and/or other components. Executing the machine-readable instructions 606 may cause the one or more physical processors 604 to effectuate encoding of content using methodology of the disclosure. The machine-readable instructions 606 may include one or more of content component 607, projection selection component 608, transformation component 610, coding (e.g., encoding and/or decoding) component 612, a distribution component 614, and/or other components.

One or more features and/or functions of the processing apparatus 602 may be facilitation of video content acquisition, generation, and/or provision of content. It is noted that although the present disclosure is directed to videos and/or video clips, one or more other implementations of system 600 and/or processing apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The processing apparatus 602 may include communication lines or ports to enable the exchange of information with a network and/or other entities. Illustration of processing apparatus 602 in FIG. 6 is not intended to be limiting. The processing apparatus 602 may include a plurality of hardware, software, and/or firmware components operating together to provide the functionality attributed herein to processing apparatus 602. For example, the processing apparatus 602 may be implemented by a cloud of computing platforms operating together as processing apparatus 602.

The processing apparatus 602 may include electronic storage 618. Electronic storage 618 may comprise electronic storage media that electronically stores information. The electronic storage media of electronic storage 618 may include one or both of system storage that is provided integrally (i.e., substantially non-removable) with processing apparatus 602 and/or removable storage that is removably connectable to processing apparatus 602 via, for example, a port or a drive. A port may include a USB port, a Fire Wire (IEEE Std. 1394) port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from processing apparatus 602, information received from external resource(s), and/or other information that enables processing apparatus 602 to function as described herein.

The system 600 may include an external resource(s) 624 operatively linked via one or more electronic communications interface 620. External resource(s) 624 may include sources of information, hosts, and/or other entities outside of system 600, external entities participating with system 600, computing platforms, and/or other resources. In some implementations, some or all of the functionality attributed herein to external resource(s) 624 may be provided by resources included in system 600.

It will be appreciated that this is not intended to be limiting and that the scope of this disclosure includes implementations in which processing apparatus 602, external resources 624, and/or other entities may be operatively linked via some other communication media.

Processor(s) 604 may be configured to provide information-processing capabilities in processing apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within a given device; the processor 604 may represent processing functionality of a plurality of devices operating in coordination. Processor 604 may be configured to execute components 607, 608, 610, 612, and/or 614 by software; hardware; firmware; some combination of software, hardware, and/or firmware; and/or other mechanisms for configuring processing capabilities on the processor 604 or other supporting components or logic.

It should be appreciated that although components 607, 608, 610, 612, and/or 614 are illustrated in FIG. 6 as being co-located within a single processing unit, in implementations in which processor 604 includes multiple processing units, one or more of components 607, 608, 610, 612, and/or 614 may be located: (i) distributed across the multiple processing units (and any supporting logic components associated therewith), and even remotely from the other components. The description of the functionality provided by the different modules or components 607, 608, 610, 612, and/or 614 described below is for illustrative purposes, and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6, the content component 607 may be configured to access and/or manage image and/or audio content. In some implementations, the content component 607 may be configured to effectuate image/audio content acquisition using any applicable methodologies including those described herein. By way of an illustration, the content component 607 may be operable to instantiate content acquisition by the capture device 110 based on a timer event, user instruction, or a sensor event. In one or more implementations, the content component 607 may be operable to effectuate content acquisition by a VR headset. In some implementations, the content component 607 may be operable to access previously acquired content from, e.g., electronic storage 618 and/or external resource 624 (e.g., external storage, and/or remote user device during content upload). The operations performed by the content component 607 may include information timestamping, adjustment of data rate, transcoding, post processing (e.g., adjusting white balance, sharpening, contrast, gamma, and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on Oct. 22, 2015, incorporated supra, and/or in a session container (e.g., such as described in detail in U.S. patent application Ser. No. 15/001,038, entitled "STORAGE OF METADATA CAPTURE APPARATUS AND METHODS AND IMAGES" filed on Jan. 19, 2016, the foregoing being incorporated herein by reference in its entirety).

In FIG. 6 projection selection component 608 may be configured to effectuate selection of a projection that may be most suitable for the content being encoded. In some implementations, the projection selection may include obtaining rate distortion cost for one or more projection types, projection arrangement, and/or projection orientation using methodology described herein, e.g., with respects for FIGS. 7A-7C. In one implementation, the projection selection component 608 may be configured to obtain orientation of the ERP (e.g., such as shown in FIGS. 4D-4E) that may minimize RDC for the content being encoded.

In FIG. 6, the transformation component 610 may be configured to transform content. In some implementations, the transformation may include re-projection, projection facet packing, and/or projection rotation operations. By way of an illustration, the transformation component 612 may be configured to rotate ERP projection from configuration of FIG. 4E to configuration of FIG. 4D, and project the image to projection configuration 4D. In some implementations, transformation component 610 may be configured to transform reference image(s) that may be used for inter-frame prediction during encoding/decoding operations.

In FIG. 6, the coding component 612 may be configured to effectuate encoding and/or decoding operations for the image and/or image block. Encoding operations may include inter and/or intra frame perdition operations. Encoding may be performed on an image or image portion, e.g., a slice, a tile and/or a coding unit) and/or other image portion. The coding component 610 may be implemented using any applicable compression technique, for example macroblocks or coding units may be coded in raster scan order (as in H.264, HVEC, and/or other video encoding technology).

In FIG. 6, a distribution component 614 may be configured to provide encoded/decoded content. The content provision may include storing the content on the electronic storage 618 for viewing, broadcasting content, and/or otherwise delivering content to one or more client devices (e.g., a smartphone) and/or external resource (e.g., cloud storage)), and/or other operations.

Methods—

Figure 7A:
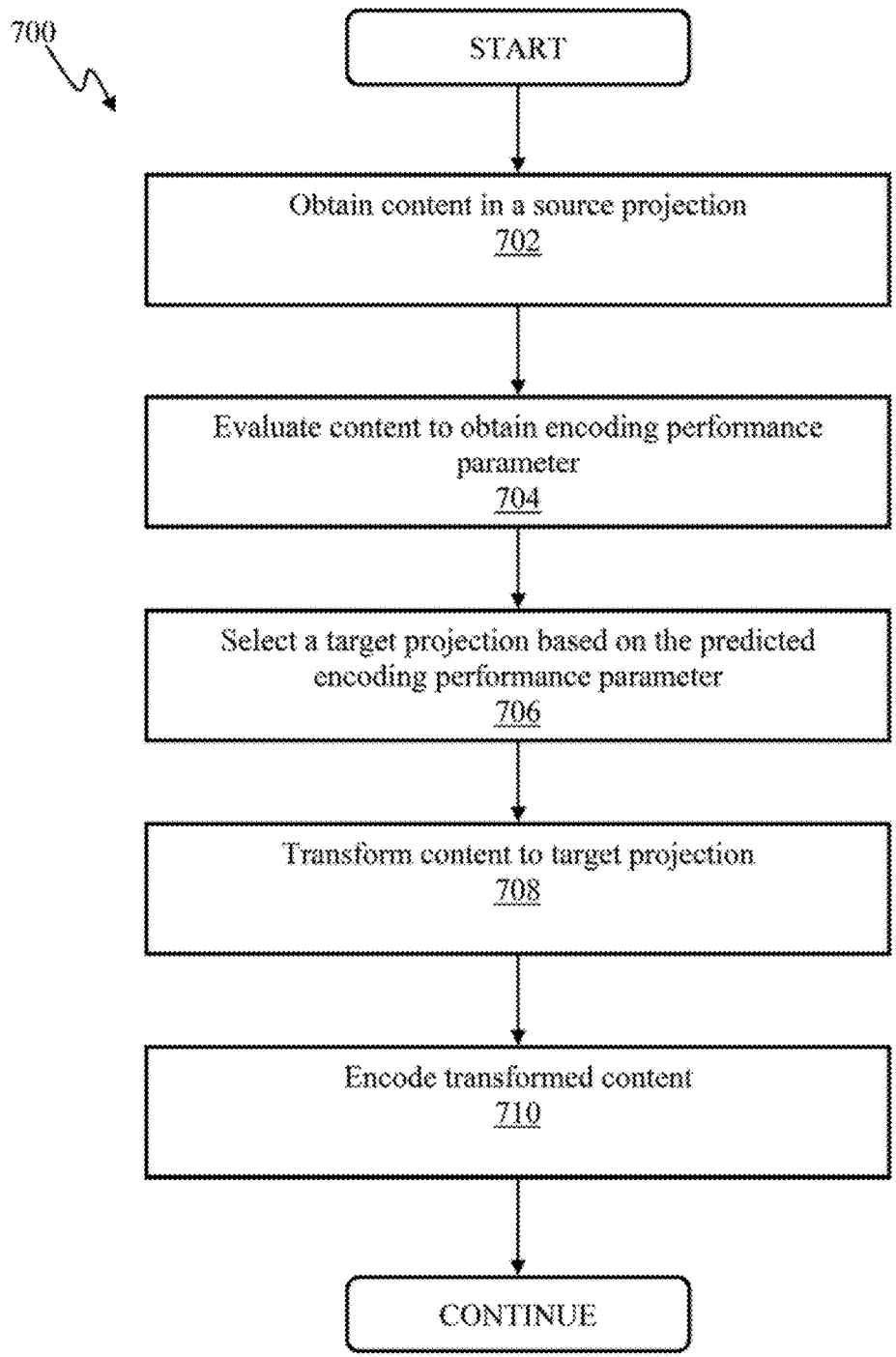
FIGS. 7A-8B are logical flow diagrams illustrating methods for image encoding and/or decoding using projection selection methodology in accordance with some implementation of the present disclosure.
Figure 7B:
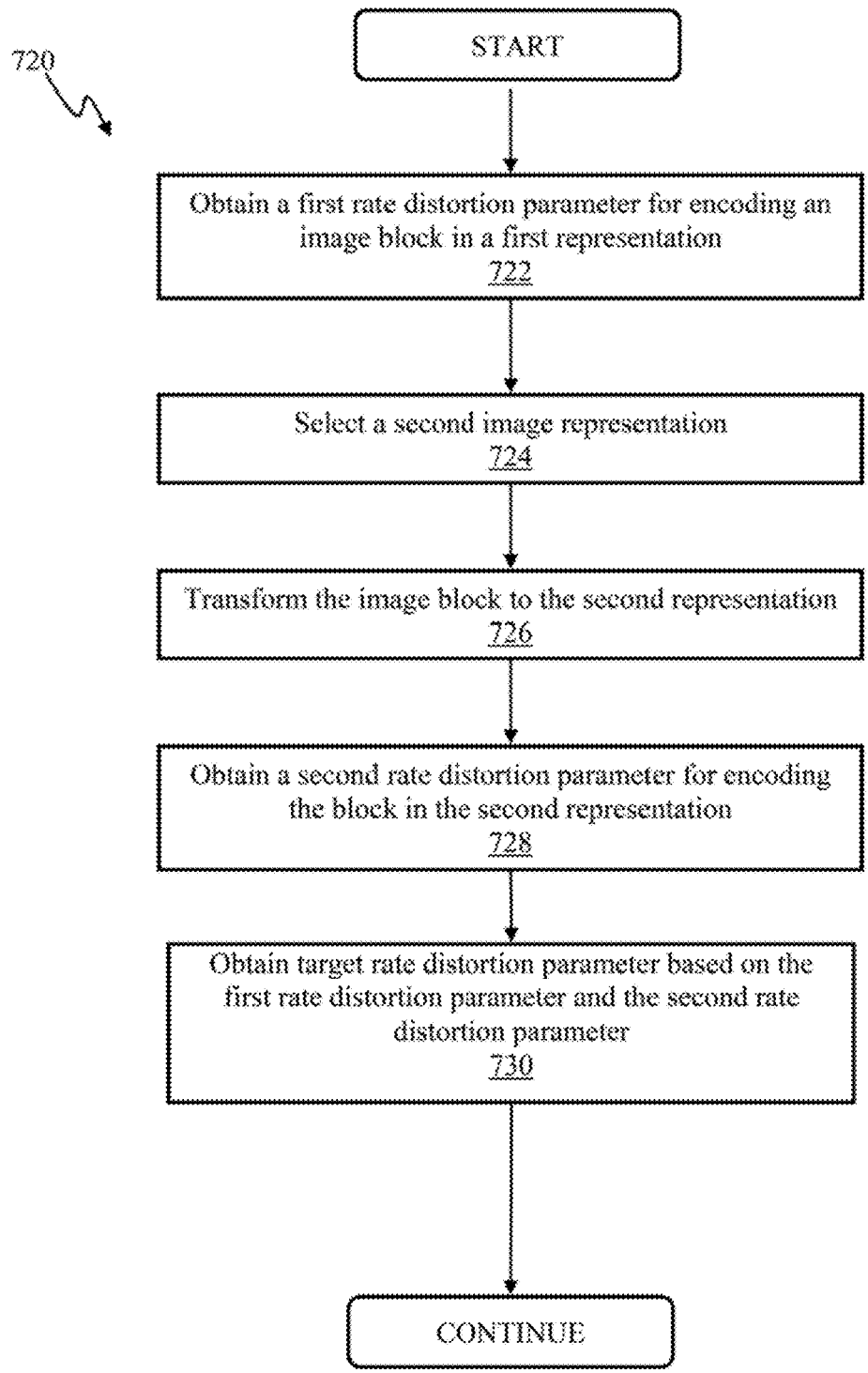
Figure 7C:
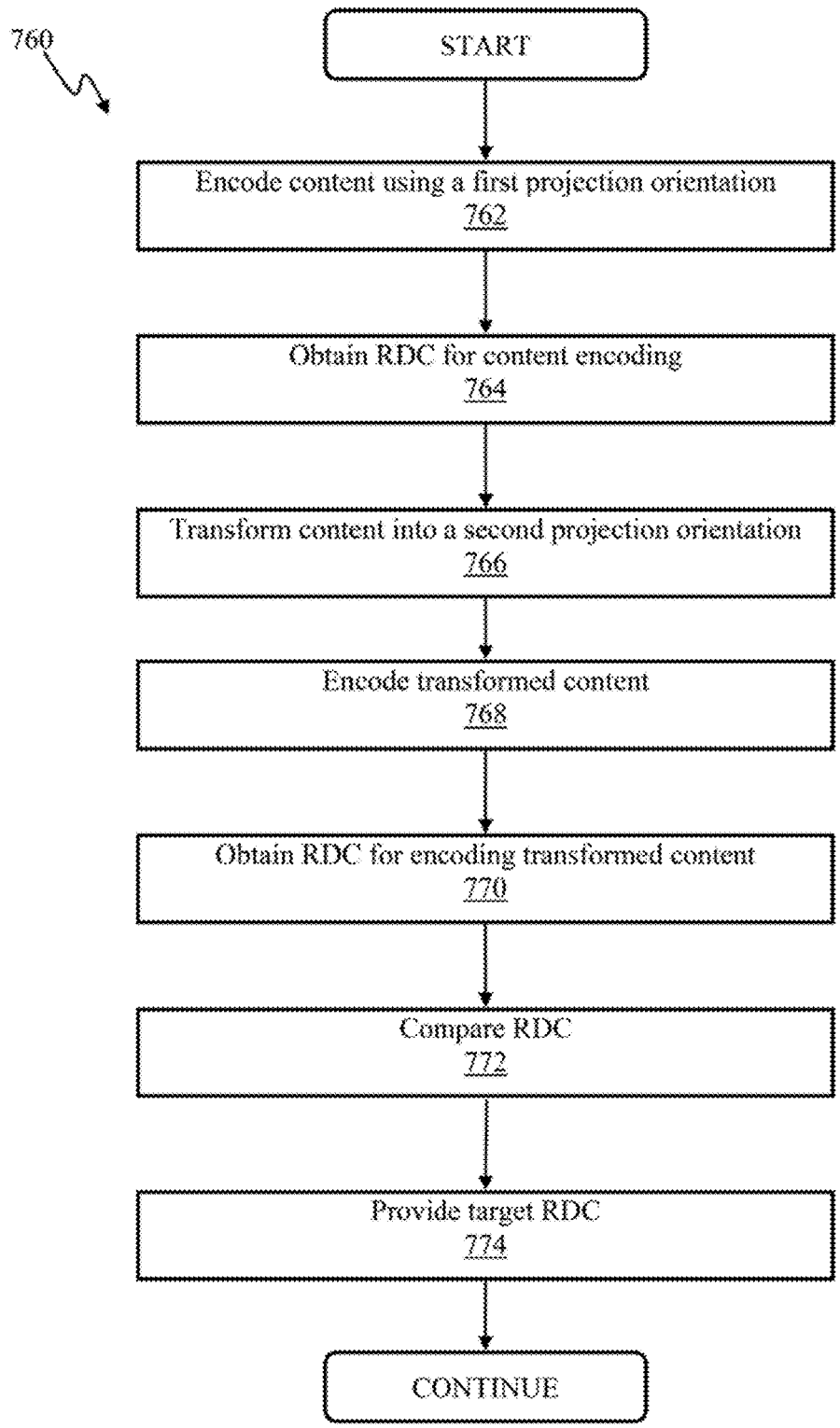
Figure 8A:
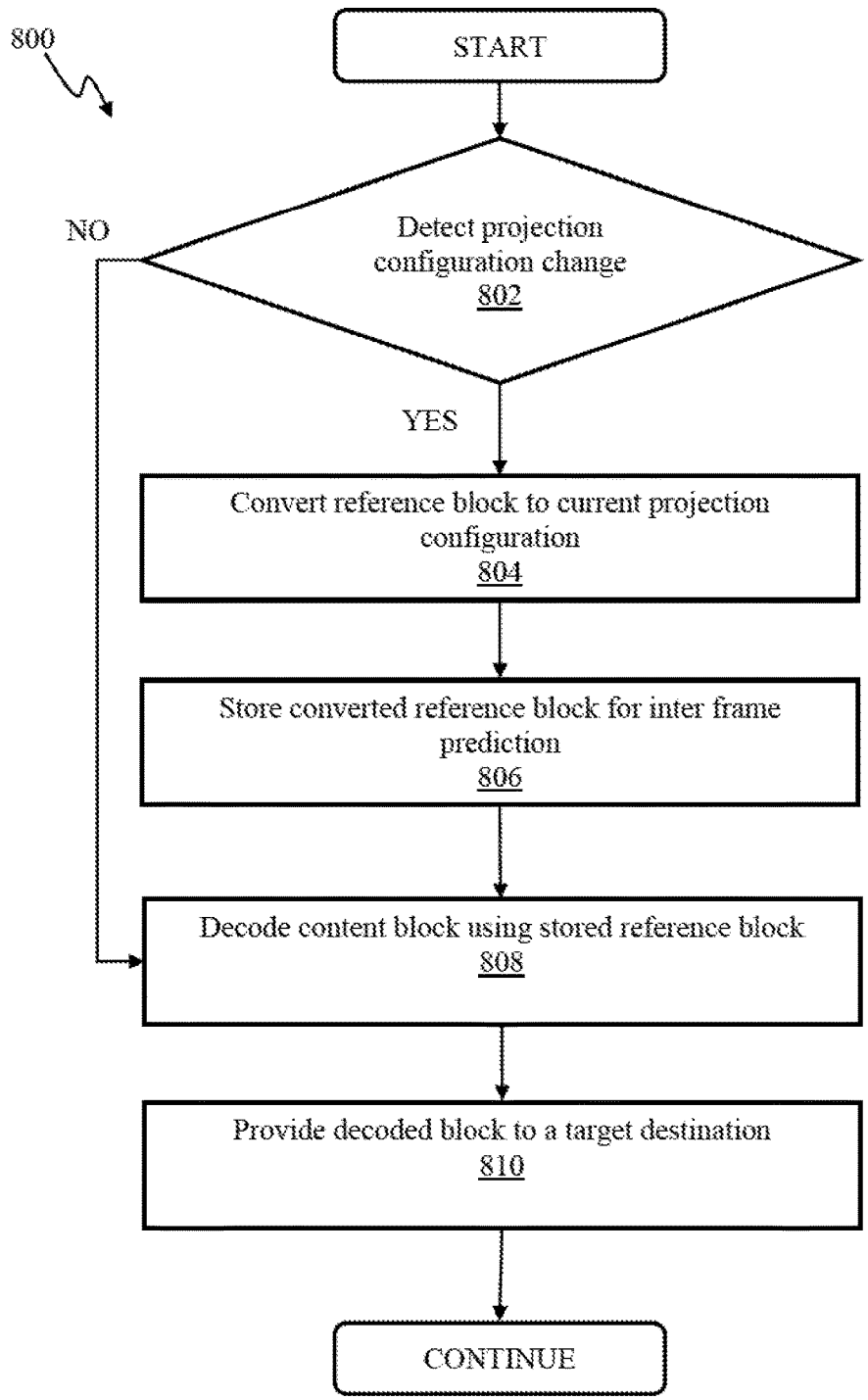
Figure 8B:
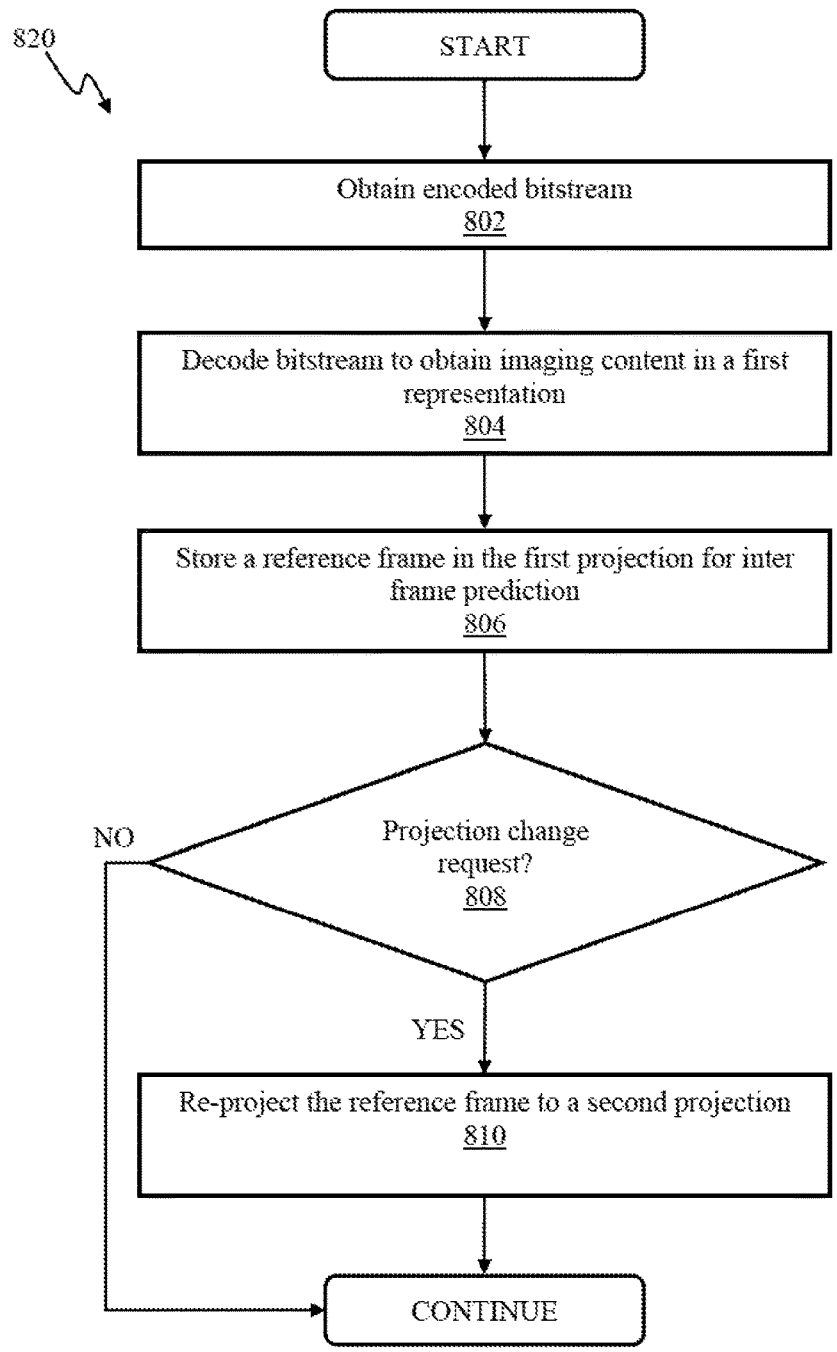
Figure 10A:
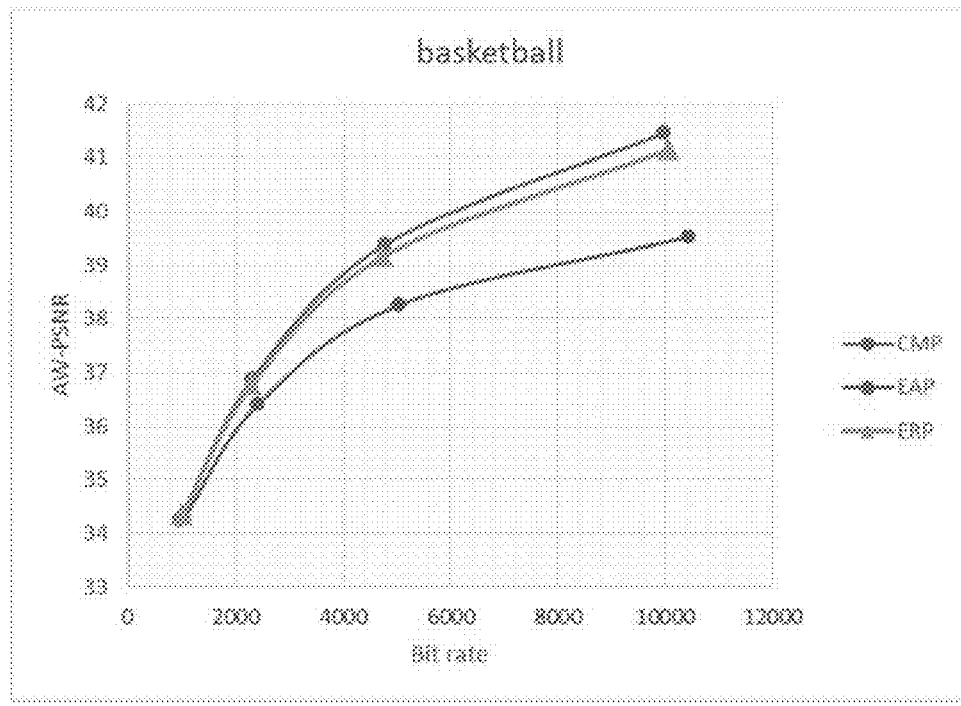
FIGS. 10A-10G present data obtained by assignee thereof illustrating encoding performance for different projections and content.
Figure 10B:
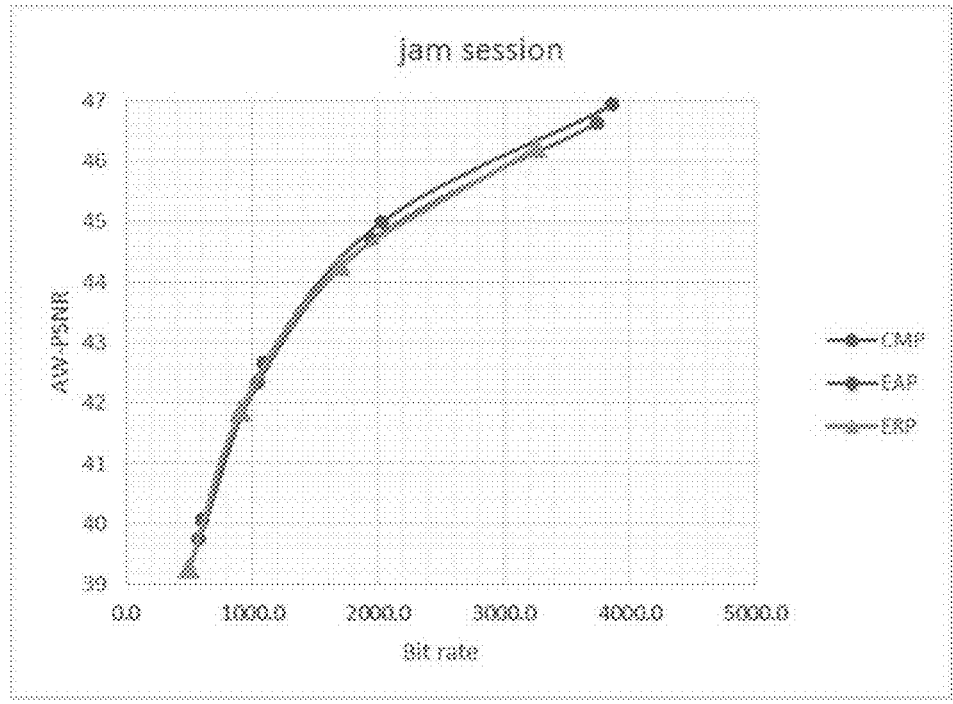
Figure 10C:
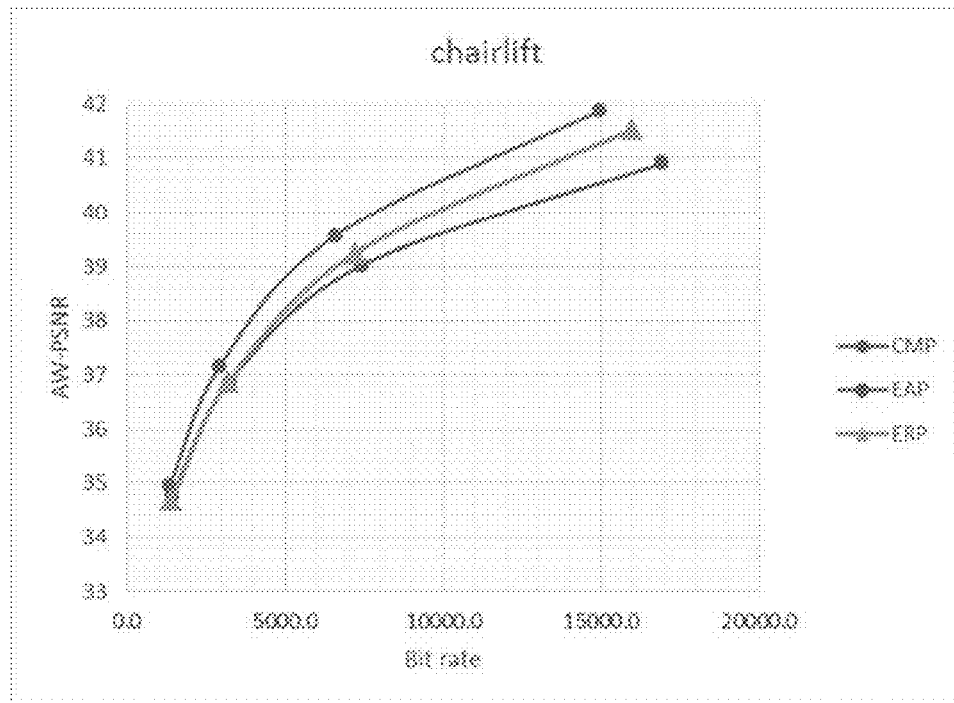
Figure 10D:
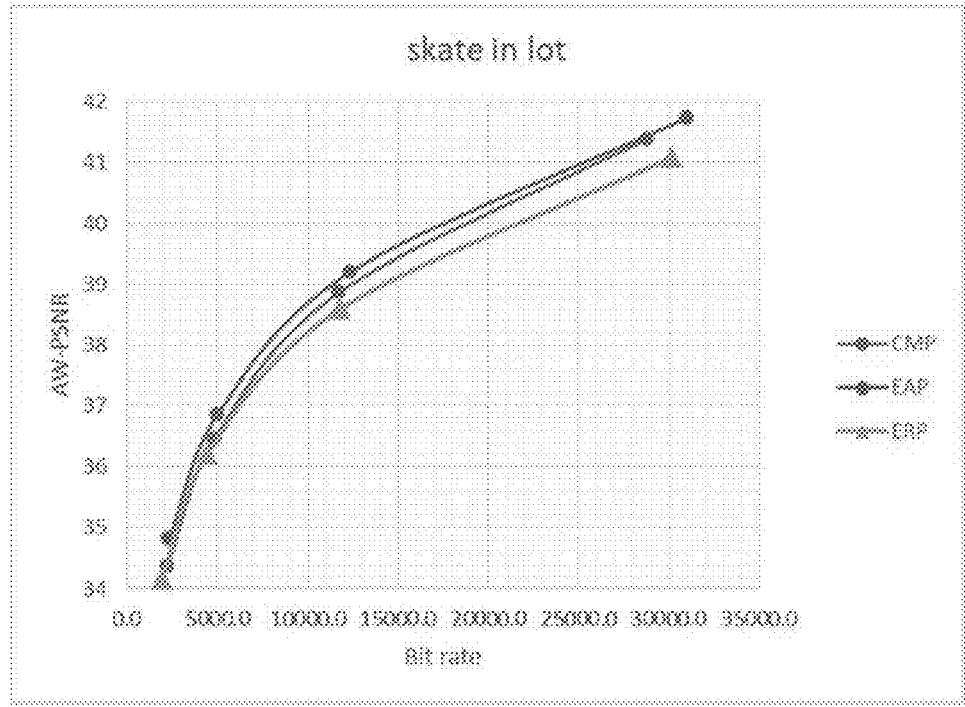
Figure 10E:
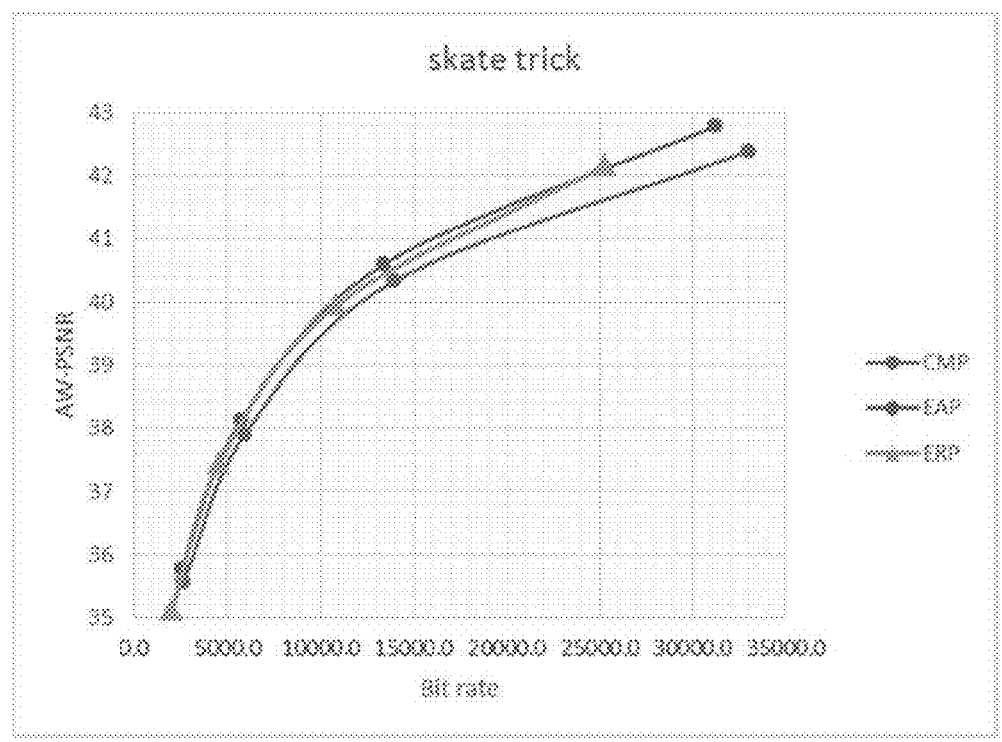
Figure 10F:
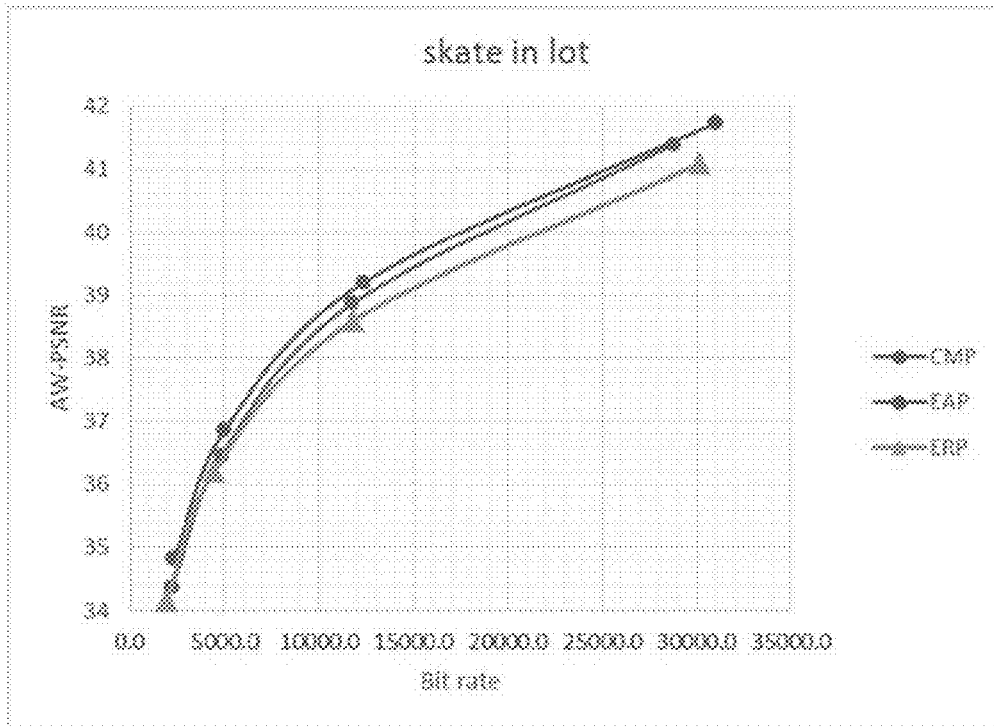
Figure 10G:
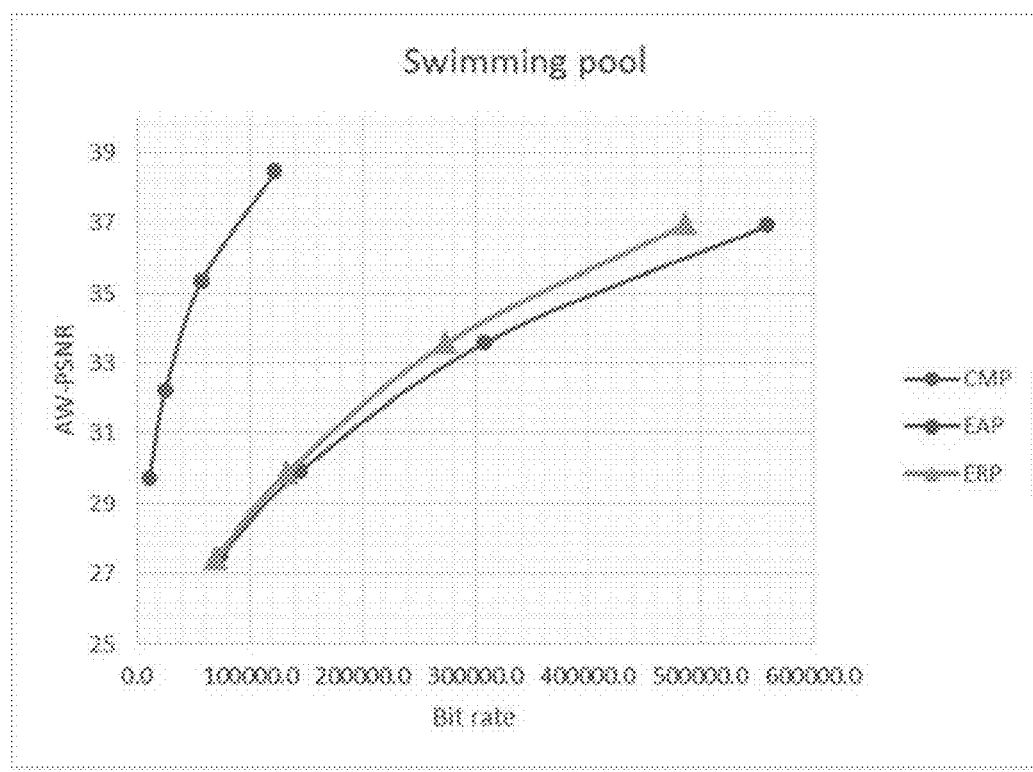

FIGS. 7A-8 illustrate methods 700, 720, 740, 800 for encoding and/or decoding of content using projection selection methodology in accordance with some implementations of the present disclosure. The operations of methods 700, 720, 740, 800 presented below are intended to be illustrative. In some implementations, methods 700, 720, 740, 800 may be accomplished with one or more additional operations not described, and/or without one or more of the operations discussed. Additionally, the order in which the operations of methods 700, 720, 740, 800 are illustrated in FIGS. 7A-8 and described below is illustrative, and not limiting.

In some implementations, methods 700, 720, 740, 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 720, 740, 800 in response to instructions stored electronically on an electronic storage medium. The one or more processing devices may include one or more devices configured through hardware, firmware, and/or software to be specifically designed for execution of one or more of the operations of methods 700, 720, 740, 800. Operations of methods 700, 720, 740, 800 may be effectuated by one or more devices and/or computerized systems including those described with respect to FIGS. 1-2 and/or FIG. 6

FIG. 7A illustrates a method of encoding panoramic content using content-based projection selection methodology of the disclosure, in accordance with some implementations. Method 700 of FIG. 7A may be implemented by, e.g., system 600 of FIG. 6 and/or encoder apparatus of FIG. 5A.

At operation 702 of method 700, content may be obtained. The content may include audio, video, photo content and/or combination thereof. In some implementations, the content may correspond to an image of a sequence of images and/or an image of a video. In some implementations, the panoramic content may include series of panoramic images (e.g., video, image burst) obtained by a multicamera capture apparatus (e.g., dual-camera system 100, six-camera apparatus 110 of FIG. 1A, and/or other capture device). In one or more implementations, content may include VR content obtained using a stereo image capture device. Content may be obtained by an action camera described herein during the activity. Content capture may be effectuated for the duration of the activity or for a portion of the activity duration. In some implementations, operation 702 may include accessing previously acquired content, e.g., stored in memory component 204 of FIG. 2 and/or a storage component 618 of FIG. 6. In one or more implementations, operations 702 may be performed by one or more physical processors executing a content component the same as or similar to the content component 607 shown in FIG. 6 and described herein. Content obtained at operation 702 may be characterized by a source projection. By way of an illustration, content captured with a single wide angle camera (e.g., HERO4 Silver, HERO5 BLACK) may be characterized by a curvilinear (e.g., fish eye) projection with 120 degree FOV; content captured by dual-lens system 100 may be characterized by fish eye projection; individual images content captured by six-camera capture apparatus 110 may be characterized by the fish-eye or curvilinear projection. Other source projections may be utilized. In some implementations of previously encoded and/or re-projected content, the source projection may correspond to a previously used projection (e.g., ERP, EAP, cube, icosahedron, tetrahedron, hexahedron, and/or other projection).

At operation 704 content may be evaluated. Content evaluation may include one or more of motion estimation (e.g. camera motion and/or object motion), occurrence of high spatial frequency features (e.g., texture) and/or other operations. Operation 704 may include determination of image encoding performance parameter. In some implementations the performance parameter may include rate distortion cost (RDC). Rate distortion cost may be utilized to obtain i) number of bits spent on encoding an image; and ii) similarity of one encoded image to input picture. Rate distortion cost may be expressed as follows:

$$RD(Cost) = D + \lambda R, \quad (Eqn. 1)$$

where R represents the rate or number of bits used to encode the image, $\lambda$ is a relative weighting parameter, and D is a measure of distortion. For equally weighting bits and distortion contribution to the RDC, $\lambda$ equal one may be used. For weighting distortion more than bit contribution, $\lambda$ greater than one may be used; for weighting distortion less than bit contribution, $\lambda$ less than one may be used.

Parameter R may be obtained by counting bits that are obtained when encoding a given image portion (block). R can also be estimated based on motion vector lengths (without full entropy coding and instead using Exponential-Golomb coding technique). Distortion parameter D may correspond to image quality metric configured based on a difference between an encoded block and the original (non-encoded) block. For regular non-VR video, the metric used most widely may include sum of absolute difference (SAD), sum of squared difference (SSD), and/or other image difference metric. SSD is also called mean square error (MSE). SAD and SSD may generally be suitable for video/image content that is not subject to any distortions because they assume undistorted model.

In some implementations, peak signal-to-noise ratio (PSNR) may be utilized to characterize distortion, and may be expressed as $$PSNR = 10 \times \log\_10(Max^{\wedge}2/MSE) \quad \text{(Eqn. 2)}$$

It may be observed from Eqn. 2 that PSNR is related to SSD and SAD metrics (because Max value is always same). For spherical images, sphere based PSNR (S-PSNR), weighted spherical PSNR (WPSNR), CPP-PSNR and/or other metrics may be utilized.

In some implementations, operation 704 may include obtaining encoding performance for one or more target projection configuration. Projection configuration may include one or more of the following parameters: projection_type (e.g., cube, hexahedron, icosahedron, equirectangular, and/or other projection), projection_orientation (e.g., orientation of projection in three dimensions with respect to sphere), and/or projection facet arrangement (e.g., such as described with respect to FIGS. 4A-4B). A given projection can be oriented in different ways. Some common projection types, arrangements and orientations may be pre-selected (e.g., in a lookup table available to encoder and decoder). Projection configuration may be signaled at sequence level, picture level, slice level and/or coding unit (aka macroblock) level. Signaling of orientation or projection may be achieved using any previously known methods, for instance supplemental enhancement information (SEI) message, video usability information (VUI) message or via sequence parameter set (SPS), picture parameter set (PPS), slice header or picture header. This information may also be entropy coded inside coding unit data elements.

At operation 706 a target projection may be selected based on the encoding performance parameter obtained at operation 704. In some implementations, operation 704 may be configured to obtain encoding performance parameter (e.g., RDC) for multiple projection configurations (e.g., multiple projection type, projection arrangement, and/or projection orientation). Individual encoding performance parameters associated with individual projection configurations may be compared. Target projection configuration may be selected such as to correspond to the lowest RDC. Selecting a target projection with a lower RDC may enable to obtain greater quality encoder output for a given bitrate level or lower bitrate output for a given quality level.

At operation 708 content may be transformed to a projection configuration that may result in reduced number of bits of video data. Content transformation may include projection transformation from source projection to target projection; projection arrangement transformation (e.g., facet re-packing), and/or projection orientation transformation.

At operation 710 transformed content may be encoded. Encoding operations may include image encoding using any applicable encoder (e.g., H.264, HEVC and/or other codec). In some implementations, operation 710 may include determining rate distortion cost of encoding content; and storing RDC values in, e.g., a buffer. RDC associated with content encoding may be analyzed (e.g., compared to one another and/or to a reference level) in order to, e.g., detect a need for projection change when RDC breaches a reference level.

Operations of method 700 may be used to determine areas within images that may be harder to encode compared other areas. A projection configuration (target projection type and/or target projection orientation) may be obtained such that hardest areas to encode may be placed closest to sphere in order to exhibit least distortion. Original content may be transformed by, e.g., re-projecting into a target projection and/or reorienting into target projection orientation. Transformed content may be encoded and rate distortion cost may be obtained as a part of encoding process.

As described herein, image areas that may be harder to encode may include areas that 1) lie on motion boundaries 2) exhibit high spatial activity e.g. checkered shirt. Areas that are easier to encode may include areas that 1) have low (or no) motion 2) are flat, e.g. sky. Image encoders may be used to perform content estimation by performing one or more of i) crude motion estimation; and ii) frame difference of currently encoded frame with reference frame. This approach may provide an estimate of how image contents may be changing. High spatial activity areas may be determined by performing frequency domain conversion e.g. by running DCT on input image or by differencing immediate pixels FIG. 7B illustrates a method of selecting a projection based on contents of a panoramic image, in accordance with some implementations. Method 720 of FIG. 7B may be implemented by, e.g., system 600 of FIG. 6 and/or encoder apparatus of FIG. 5A. Operations of method 720 may be performed on a per-block basis. As used herein, the term block may be used to refer to a unit of image samples that may include an image, an image portion, (e.g., a slice, a tile and/or a coding unit) and/or other image portion. Methodology of method 720 may be utilized with intra and/or inter frame image coding.

At operation 722 a first rate distortion parameter may be obtained based on encoding an image block in a first representation. In some implementations, the image block may correspond to a slice of a captured image in a source projection (e.g., image obtained with a capture device 110 of FIG. 1A and/or 100 of FIG. 1B). The source projection may correspond to a fish-eye or near-fish eye curvilinear pattern of a camera lens. In some implementations, the first representation may correspond to a projection configuration previously used for encoding the image block. In some implementations, first representation may include projection type, projection arrangement, and/or projection orientation parameters. Rate distortion may be obtained using metrics of Eqn. 1 and/or Eqn. 2. For a given projection type (e.g., ERP) rate distortion determination operation 722 may include obtaining rate distortion by encoding block for multiple values of projection orientation in order to determine target projection orientation for contents of the image content being encoded.

At operation 724 a second image representation may be selected. In some implementations, the second_representation may be characterized by one or more or projections type, projection facet arrangement and/or projection orientation. Image representation selection operation 724 may correspond varying of projection orientation operation described above with respect to operation 722.

At operation 726 image block may be transformed to second representation. In some implementations, image block transformation may include image block re-projection, image block rearrangement, and/or image block rotation. Operation 726 may include transforming reference image block of data (that currently may be used for inter-frame prediction) into the second representation if applicable.

At operation 728 a second rate distortion parameter may be obtained. The second rate distortion parameter may include RDC obtained by encoding the image block that has been transformed into the second representation at operation 726.

At operation 730 a target rate distortion parameter may be obtained. Target rate distortion determination may include comparison of the second RDC of operation 728 to the first RDC of operation 722. Responsive to a determination that the second rate distortion value is smaller than the first distortion value operation 730 may assign the target rate distortion to the second rate distortion value. Responsive to a determination that first second rate distortion value is smaller or equal than the first distortion value operation 730 may assign the target rate distortion to the first rate distortion value.

Operations of method 720 may be used to iterate through multiple projection configurations, by e.g., varying one or more of projection type, projection arrangement and/or projection orientation. Comparing RDC obtained for different combinations of projection parameters, a projection with lowest rate distortion cost (target rate distortion) may be selected as target projection. The target projection may be utilized for encoding the rest of the imaging content. In some implementations, operations of method 730 may be performed until RDC for a given projection configuration may breach a given threshold (e.g., fall below a given value).

Operations of method 730 may be performed at any time during encoding of panoramic content in order to determine if projection configuration format needs to be changed, e.g., due to changes of object motion and/or texture within imaging content. Output of the method 730 operations may include projection type, projection arrangement and/or projection orientation parameters corresponding to projection configuration with the lowers RDC or (RDC below a given value) and used to signal projection change as applicable.

Figure 5A:
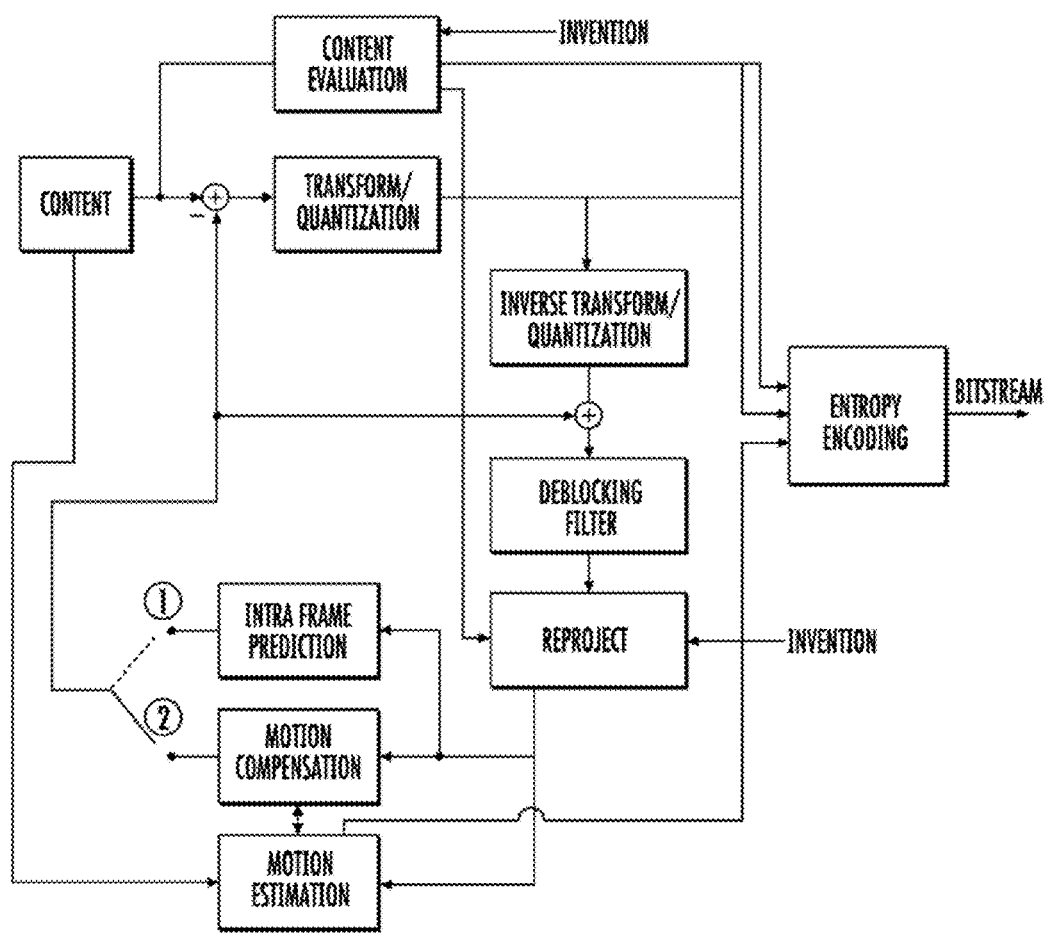
FIG. 5A is a functional block diagram illustrating an exemplary encoder configuration configured to implement content decoding using projection selection methodology of the disclosure, in accordance with one implementation.
Figure 5B:
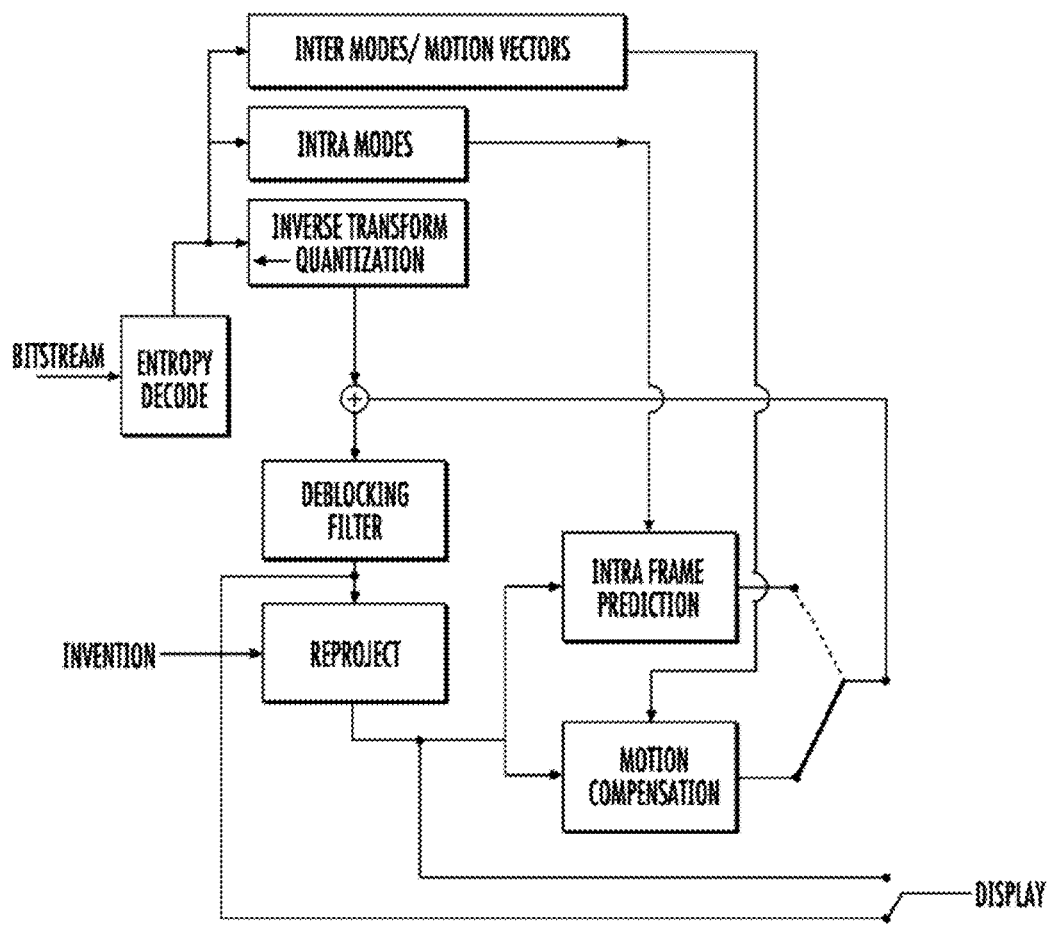
FIG. 5B is a functional block diagram illustrating an exemplary decoder configuration configured to implement content decoding using projection selection methodology of the disclosure, in accordance with one implementation.

Subsequent to projection change signaling, an encoding apparatus e.g., of FIG. 5A may encode content using updated projection configuration until there is another projection switch signaling.

In some implementations, target projection determination operation may include determination of projection orientation shown and described with respect to FIG. 7C. Operations of method 760 of FIG. 7C may include the following.

At operation 762 content be encoded. Content may include imaging content e.g., such as described with respect to FIG. 7A. Content may be represented in a given projection at a first projection orientation At operation 764 rate distortion cost may be determined for encoding operation 762. Rate distortion cost may be determined using any applicable bitrate and distortion measures including those described with respect to Eqn. 1-Eqn. 2/

At operation 766 content may be transformed into a second projection orientation (by, for example, applying appropriate rotation with respect to the sphere and re-projection).

At operation 768 content transformed at operation 766 may be encoded, e.g., using an encoder used at operation 762.

At operation 770 second rate distortion cost may be obtained for encoding content at operation 768.

At operation 772 a comparison of rate distortion costs may be performed. In some implementations comparison may include comparing the second RDC to the first RDC and assigning a target RDC to the smaller of the two. Comparison operation may include comparing current target RDC (e.g., lowest previously attained RDC) to the second RDC and/or the first RDC; and assigning the smaller of the RDC to the current target RDC. Operation 772 may be used to obtain projection orientation corresponding to the lowest RD(cost) when encoding a given image in a given projection.

At operation 774 target RDC may be provided. The target RDC may correspond to the smallest RDC obtained after trying different projection orientations. A projection configuration (e.g., projection type and orientation) may be provided at operation 774. Information provided at operation 774 may be used to obtain target projection configuration for encoding content.

FIG. 8A illustrates a method of decoding panoramic content using content-based projection selection methodology of the disclosure, in accordance with some implementations. Method 800 of FIG. 8 may be implemented by, e.g., decoder apparatus 550 of FIG. 5B.

At operation 802 projection configuration change may be detected. In some implementations, projection configuration may be signaled by one or more parameters provided with a picture block in encoded bitstream. Projection configuration may include projection type parameter (e.g., cube, equirectangular, and/or other), projection arrangement (e.g., facet packing); and/or projection orientation (e.g., vertical, horizontal, at an angle within three-dimensional space). By way of an illustration, projection configuration change may be determined based on an evaluation of a projection bit-field for within encoded bitstream current picture block. Current value of the projection bit-field may include information indicating horizontally oriented ERP, e.g., such as shown in FIG. 4D. Operation 802 may include comparing current value of the projection bit-field to a previous value of the projection bit-field (e.g., associated with previous picture block). By way of an illustration, previous projection bit field may include information indicating vertically oriented cube, e.g., such as shown in FIG. 4F.

At operation 804, reference block may be converted to current projection configuration. In some implementations, where in inter frame prediction may be performed, reference block projection conversion may facilitate inter frame prediction. Reference block conversion may include re-projecting the block from previously used projection (e.g., vertical cube) to current projection (ERP), re-orientation of the re-projected block (e.g., to horizontal ERP) and/or projection facet arrangement (e.g., such as described with respect to FIGS. 4A-4B).

In one or more implementations wherein inter frame prediction may be not used, operation 804 may be skipped.

At operation 806 converted reference block may be stored. In some implementations, the reference block may be stored in decoder memory and/or on other electronic storage (e.g., disk).

At operation 808 converted reference block may be used to decode current block using inter frame decoding. Decoding operation may include determination of a residual, adding the residual to a predicted block, and/or performing in-loop filtering. In some implementations, the decoded image may be stored in the reference frame buffer for inter-frame decoding of subsequent images.

At operation 810, the decoded block may be provided to a target destination. In some implementations, the target destination may include a content display device, an electronic storage, a network controller, and/or other destination configured to store and/or display panoramic content.

In some implementations, projection configuration information may be signaled at Intra Decode Refresh (IDR) frame update time. IDR frames are frequently used to reset a state of the decoder (e.g., reset the reference frames).

Using IDR frames for signaling projection change may alleviate need to perform block conversion operation of method 800.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", and "link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A system configured to encode images using adaptive projection selection, the system comprising:
a network interface;
one or more physical processors; and
a storage apparatus in data communication with the one or more physical processors, the storage apparatus comprising a plurality of machine-readable instructions, the plurality of machine-readable instructions configured to, when executed by the one or more physical processors, cause the system to:
obtain a content block of data in a first projection;
obtain a first rate distortion parameter associated with encoding the content block of data in the first projection;
obtain a second rate distortion parameter associated with encoding the content block of data in a second projection, the second projection differing from the first projection;
responsive to a determination that the second rate distortion parameter is lower than the first rate distortion parameter, select the second projection for the content block of data;
obtain an encoded content block by encoding the content block of data in the second projection; and
provide the encoded content block and a second projection configuration parameter to a target destination via the network interface.

2. The system of claim 1, wherein the first rate distortion parameter and the second rate distortion parameter each include a rate distortion cost parameter.

3. The system of claim 2, wherein the rate distortion cost parameter comprises a function of a number of bits used to encode an image and a measure of distortion.

4. The system of claim 3, wherein the measure of distortion corresponds to an image quality metric, the image quality metric configured based on a difference between the encoded content block and the content block of data in the first projection.

5. The system of claim 2, wherein the rate distortion cost parameter comprises a function of a peak signal-to-noise ratio, the function of the peak signal-to-noise ratio including a measure of mean square error.

6. The system of claim 1, wherein the first projection and the second projection each comprise a differing projection type.

7. The system of claim 6, wherein the differing projection types are selected from the group consisting of a cube projection, a hexahedron projection, an icosahedron projection, and an equirectangular projection.

8. The system of claim 1, wherein the first projection and the second projection each comprise a differing projection facet arrangement.

9. The system of claim 8, wherein the differing projection facet arrangements each comprise a same projection type.

10. An encoder apparatus configured to encode content, the encoder apparatus comprising:
a network interface in data communication with one or more physical processors, the one or more physical processors comprising logic configured to:
obtain content in a given projection;
encode the content with the given projection along a default orientation;
compute a rate distortion cost of encoding the content with the given projection along the default orientation;
re-orient the content in a different orientation;
encode the content with the given projection along the different orientation;
compute a rate distortion cost of encoding the content with the given projection along the different orientation;
compare the rate distortion cost of encoding the content with the given projection along the default orientation with the rate distortion cost of encoding the content with the given projection along the different orientation to find an orientation that takes a lowest rate distortion cost to encode the content; and
provide the encoded content with the lowest rate distortion cost to the network interface.

11. The encoder apparatus of claim 10, wherein the one or more physical processors further comprises logic configured to return the lowest rate distortion cost and provide the lowest rate distortion cost to a display device.

12. The encoder apparatus of claim 10, wherein the computed rate distortion cost comprises a function of a number of bits used to encode an image and a measure of distortion.

13. The encoder apparatus of claim 10, wherein the computed rate distortion cost comprises a function of a peak signal-to-noise ratio, the function of the peak signal-to-noise ratio including a measure of mean square error.

14. The encoder apparatus of claim 10, wherein the given projection is selected from the group consisting of an equirectangular projection, a cube map projection, an equal area projection, an icosahedron projection, an octahedron projection, and a segmented sphere projection.

15. The encoder apparatus of claim 10, further comprising logic configured to:
re-orient the content in a third orientation;
encode the content with the given projection along the third orientation;
compute a rate distortion cost of encoding the content with the given projection along the third orientation; and
compare the rate distortion cost of encoding the content with the given projection along the third orientation with the rate distortion cost of encoding the content with the given projection along the default orientation and the rate distortion cost of encoding the content with the given projection along the different orientation in order to find the orientation that takes the lowest rate distortion cost to encode the content.

16. A method of encoding images using adaptive projection selection, the method comprising:
obtaining a first rate distortion parameter for encoding an image block in a first image representation;
selecting a second image representation, the second image representation differing from the first image representation;
obtaining a second rate distortion parameter for encoding the image block in the second image representation; and
obtaining a target rate distortion parameter by comparing the first rate distortion parameter with the second rate distortion parameter;
wherein the second image representation differs from the first image representation by altering one or more of a projection type, a projection arrangement, and a projection orientation.

17. The method of claim 16, further comprising determining that the second rate distortion parameter is less than the first rate distortion parameter and assigning the target rate distortion parameter to the second rate distortion parameter.

18. The method of claim 17, further comprising encoding the image block using the second image representation and providing the second image representation to a network interface.

19. The method of claim 16, further comprising determining that the first rate distortion parameter is less than the second rate distortion parameter and assigning the target rate distortion parameter to the first rate distortion parameter.

20. The method of claim 16, wherein the obtaining of the first rate distortion parameter and the obtaining of the second rate distortion parameter comprises computing a rate distortion cost as a function of a number of bits used to encode an image and a measure of distortion.

* * * * *